United States Patent
Oh et al.

[19]

[11] Patent Number: 6,059,657
[45] Date of Patent: May 9, 2000

[54] GAME MACHINE

[76] Inventors: Ketsu Oh, 1-34, Sumiyoshihigashimachi, Higashinada-ku; Shingo Yamaoka, 189-3, Myohojiazafudemae, Suma-ku, both of Kobe-shi, Hyogo-ken, Japan

[21] Appl. No.: 08/790,695

[22] Filed: Jan. 29, 1997

Related U.S. Application Data

[63] Continuation-in-part of application No. 08/491,797, Jun. 19, 1995, Pat. No. 5,723,855.

[30] Foreign Application Priority Data

Jan. 31, 1996 [JP] Japan ..................................... 8-035687

[51] Int. Cl.[7] ............................... A63F 9/14; G01C 21/02
[52] U.S. Cl. ................................ 463/6; 463/16; 463/25; 250/206.1; 250/221; 446/444
[58] Field of Search .................................. 463/1, 6, 7, 16, 463/25, 29–31, 36, 58–60; 273/236, 237, 275, 138.1, 139, 138.2; 446/444, 454; 250/206.1, 221, 208.1, 222.1

[56] References Cited

U.S. PATENT DOCUMENTS

| | | | |
|---|---|---|---|
| Re. 32,662 | 5/1988 | Pennington | 463/34 |
| 4,898,404 | 2/1990 | Babcock | 446/71 |
| 5,269,687 | 12/1993 | Mott | 463/6 |
| 5,320,351 | 6/1994 | Suzuki | 463/46 |
| 5,472,192 | 12/1995 | Eto | 463/6 |
| 5,501,455 | 3/1996 | Hirata et al. | 463/6 |
| 5,588,654 | 12/1996 | Voigt, IV et al. | 273/284 |
| 5,723,855 | 3/1998 | Oh et al. | 446/444 |

FOREIGN PATENT DOCUMENTS

| | | |
|---|---|---|
| H-194884 | 4/1989 | Japan . |
| 2291302 | 1/1996 | United Kingdom . |

OTHER PUBLICATIONS

'Video Games' by Len Buckwalter, 1977, pp. 99–111.
'Screen Games', Time, May 22, 1972, 1 page.

*Primary Examiner*—Jessica J. Harrison
*Assistant Examiner*—M. A. Sager

[57] ABSTRACT

A game machine provided with moving means running on a specified race track includes drive controlling means for controlling the moving means to run on the specified race track which is selected from among a plurality of race tracks. The game machine can keep game players amused for a longer period of time and change a layout of race track in a shorter period and with a lower cost.

13 Claims, 16 Drawing Sheets

GAME MACHINE

This is a Continuation-In-Part application of U.S. Ser. No. 491,797 filed Jun. 19, 1995, now U.S. Pat. No. 5,723,855 issued Mar. 3, 1998.

BACKGROUND OF THE INVENTION

This invention relates to a game machine in which a movable object simulating a racing car, racing horse and the like is allowed to run along a specified race track.

There have been known various game machines in which a movable object (moving means) simulating a racing car or horse is allowed to run on a specified race track. One of such game machines is disclosed in Japanese Unexamined Patent Publication No. 1-94884. The game machine in this publication is such that a plurality of movable objects simulating a horse run, while freely run over a specified race track. Game players enjoy the game by predicting the ranking of horses and betting a number of tokens on the horse he predicts to be the winner. In this game machine, the respective horses can run while freely changing their routes in the race track. However, there is another type of game machine in which movable objects run along their respective predetermined routes on a race track.

In the aforementioned conventional type of game machine in which movable objects simulating a horse run along the predetermined race tracks, the variation of game which players can enjoy is limited and thus becomes monotonous, because the movement of the movable object is limited (at least in one direction, either widthwise directions or forward and backward) directions owing to the fact that the movable object can move on the fixed predetermined race track. Accordingly, the game machine does not, in a strict sense, simulate an actual car race or horse race, resulting in a difficulty in keeping the players amused for a longer period.

To keep the players amused with the game machine for a longer period, there is an idea of changing the course design (track layout) of the conventional game machine periodically (e.g., every several months). However, to change the track layout, it is required to change the overall specifications of an internal device of the game machine, not to mention change of the design of a base for the game machine itself. Accordingly, this idea results in a great increase of cost and time and is not feasible.

SUMMARY OF THE INVENTION

It is an object of the present invention to provide a game machine which has overcome the problems residing in the prior art.

It is another object of the present invention to provide a game machine capable of amusing game players for a longer time and changing a layout of race track in a shorter time and with a lower cost.

The present invention is directed to a game machine provided with moving means running on a specified race track comprising: drive controlling means for controlling the moving means to run on the specified race track which is selected from among a plurality of race tracks.

The moving means may take any form as far as it can run on the race track. For example, the moving means may be a moving object simulating a horse, bicycle, boat, car or equivalent. Note that the contents of game machine are varied depending on what type of moving object is employed. When a moving object simulating a horse is employed, the game machine becomes a racing horse game machine. When a moving object simulating a racing car is employed, the game machine becomes a racing car game machine.

The drive controlling means essentially controls the moving means to run on the selected race track by self-controllably determining a moving path or route on the race track along which the moving means is to run. A player of the game machine may select and decide the race track where the moving means is to run, from among the plurality of race tracks. Alternatively, the game machine itself may randomly select the race track periodically (at a specified time interval) or each time after the game is played on the same race track for a specified number of times.

With the game machine thus constructed, the drive controlling means controls the moving means to run on the specified race track selected from among the plurality of race tracks. Thereby, the moving means can run on the selected race track.

In one aspect of the invention, the game machine comprises course data storage means for storing course data corresponding to the plurality of race tracks therein, and the drive controlling means controls the moving means to run on the specified race track in accordance with the course data corresponding to the specified race track.

The data storage means stores the course data corresponding to the plurality of race tracks. The moving means is controlled to run on the specified race track in accordance with the course data, read out from the data storage means, corresponding to the specified race track. As will be described later, the course data includes a data for designating a route for a plurality of moving objects of the moving means and a data for designating a coordinate representing the race track. The course data may include a data of the width of race track (i.e., the dimension extending along the widthwise direction of the moving means). In such case, the drive controlling means controls the moving means to move in the widthwise direction thereof within the width of race track.

The invention is also applicable to the case that a plurality of routes or trajectories are set in advance on the race track and the moving means runs along any of the predetermined route, while changing its route to another one at a specified point set in advance. In such case, the course data may include a data on the specified point of route to determine at which point the moving means is to change its route.

With the game machine thus constructed, the drive controlling means controls the moving means to run based on the course data corresponding to the race track, read out from the course data storage means, when the race track is selected from among the plurality of race tracks.

In another aspect of the invention, the moving means includes a plurality of moving objects running on the specified race track, and the course data is a data for allowing the respective moving objects to run on the specified race track independently of one another.

The data for allowing the respective moving objects to run independently of one another includes, e.g., a data for designating a route for the respective moving objects to be described later, and a data for designating a coordinate for the respective race tracks within which the moving objects are to run. There may be considered two difference cases: one is that a plurality of routes on the race track are predetermined to render the respective moving objects run along the predetermined routes; and the other is that the moving objects can run, while freely changing the routes within the race track. In the former case wherein moving independently of one another is meant such, for instance, that a running distance along the route which a specified moving object moves at a specified time and the route along which the moving object is to run can be set individually for the respective moving objects. In the latter case, it means that the target position on the race track where each moving object is to be located at a specified time can be set individually for the respective moving objects.

With the above arrangement, in controlling the moving objects to run on the specified race track by reading out, from the data storage means, the course data corresponding to the specified race track, the drive controlling means refers to the course data for the respective moving objects.

In still another aspect of the invention, the course data is a data for designating a route for the respective moving objects along which the moving object is to run. Accordingly, the drive controlling means controls the individual moving objects to run on the specified race track by reading out, from the data storage means, the course data corresponding to the specified race track and by designating the route for the individual moving objects.

In yet another aspect of the invention, the course data includes a data concerning a number of target points arranged in such a manner that the respective moving objects to pass the target points in time sequence along the route; and the drive controlling means controls the moving objects to run along the respective routes, while aiming at the target points arranged on the routes.

The term "in time sequence" in the above context simply means that "at every specified time interval". However, the interval may not necessarily set equally. With this arrangement, when the drive controlling means controls the respective moving objects to run toward the target points along the corresponding route, the moving objects run along the individual route obtained by connecting these target points.

In still further aspect of the invention, the course data is a data for designating a coordinate with respect to the specified race track. With this arrangement, the drive controlling means controls the respective moving objects to run based on the coordinate representative of the race track, while referring to the course data corresponding to the specified race track, read out from the course data storage means.

In yet another aspect of the invention, the drive controlling means controllably regulates the respective moving objects from running off the race track. With this arrangement, the drive controlling means regulates the individual moving objects from running off the race track, based on the coordinate representative of the race track, while referring to the course data corresponding to the specified race track, read out from the course data storage means.

In still further aspect of the invention, the game machine further comprises position detecting means for detecting a position of the respective moving objects on the race track, and the drive controlling means controls a movement of the respective moving objects based on a distance between the respective moving objects.

The position detecting means is a device for detecting a position of the respective moving objects on the race track. For instance, the position detecting means may be: a device for detecting a position of the moving object by processing an image data output from imaging means such as a CCD (Charge Coupled Device) camera capable of sensing an arbitrary position on the race track; a device for detecting a position of the moving object by use of a distance sensor capable of detecting the distance from the moving object with use of ultrasonic wave; and a device such as a tablet for directly detecting a coordinate position of the moving object. With this arrangement, the drive controlling means can control the respective moving objects to run on the race track based on a signal detected by the position detecting means.

In still another aspect of the invention, the game machine includes a main body and also a replaceable member which is detachably mounted onto the main body and the race track can be provided on the replaceable member. With this arrangement, changing the replacing member with another one enables selection of the race track. Thus, the moving means can run on the selected race track.

In yet another aspect of the invention, the drive controlling means includes selecting means for selecting the race track on which the moving means is to run, from among the plurality of race tracks. With this arrangement, the drive controlling means controls the moving means to run on the race track selected by the selecting means.

In still further aspect of the invention, the selecting means includes: a display member in the form of sheet provided with the plurality of race tracks; and exposure means for exposing a specified area of the display member to select the race track on which the moving means is to run.

The display member is e.g., made of a flexible material printed with a layout (design) of a plurality of race tracks thereon. The display member may be provided with the plurality of race tracks in a specified direction. In this case, the display member has a relatively elongated shape. Alternatively, the layout of race tracks may be arranged at any arbitrary position over the display member here and there.

The exposure means is adapted for rendering the specified area of the display member exposed outside to select the race track. The exposure means may be provided with a feed mechanism capable of feeding the sheet-like display member in a specified direction (feeding direction). By feeding the display member in the feeding direction by the feed mechanism, the display member has the specified area thereof by a specified length exposed to outside.

With the above arrangement, when the specified area of the display member is exposed to outside by the exposing means, the race track corresponding to the exposed area appears, thereby selecting the race track from among the plurality of race tracks. The drive controlling means controls the moving means to run on the selected race track.

In yet another aspect of the invention, the selecting means includes display means for displaying the race track on a running surface on which the moving means runs.

The display means is adapted for displaying the race track on the running surface of the moving means. The display means includes a display device such as a CRT (Cathode Ray Tube), liquid crystal display device or equivalent. Taking into account the likelihood that the display device is worn out accompanied by the movement of the moving means, preferably the display device is mounted with a transparent plate such as a glass plate to allow the moving means to run on a surface of the plate. In case that the race track occupies a large area, a plurality of image display devices are arranged in such a manner that display screens of the image display devices are mounted flush with one another to make a flat surface.

Alternatively, the display means may be a projector for projecting an image onto the running surface of the moving means or an arrangement in which a number of light emitting elements are arranged along a contour of the individual race tracks and the light emitting elements representing the contour of the selected race track are driven to emit light in correspondence with the selection of race track.

With the game machine thus constructed, the drive controlling means controls the moving means to run on the race track displayed by the display means.

In still further aspect of the invention, the game machine further comprises position detecting means for detecting a position of the moving means on the race track; target position calculating means for calculating a target position of the moving means based on the position of the moving means detected by the position detecting means; and target control means for controlling the moving means to run toward the target position calculated by the target position calculating means.

With the game machine thus constructed, the target position calculating means calculates the target position of the moving means based on a detection signal output from the position detecting means, and the target control means controls the moving means to move toward the target position in accordance with an output signal from the target position calculating means.

These and other objects, features and advantages of the present invention will become more apparent upon a reading of the following detailed description and accompanying drawings.

DETAILED DESCRIPTION OF THE PREFERRED EMBODIMENTS OF THE INVENTION

Hereinafter, preferred embodiments of the present invention are described referring to the accompanying drawings.

Figure 1:
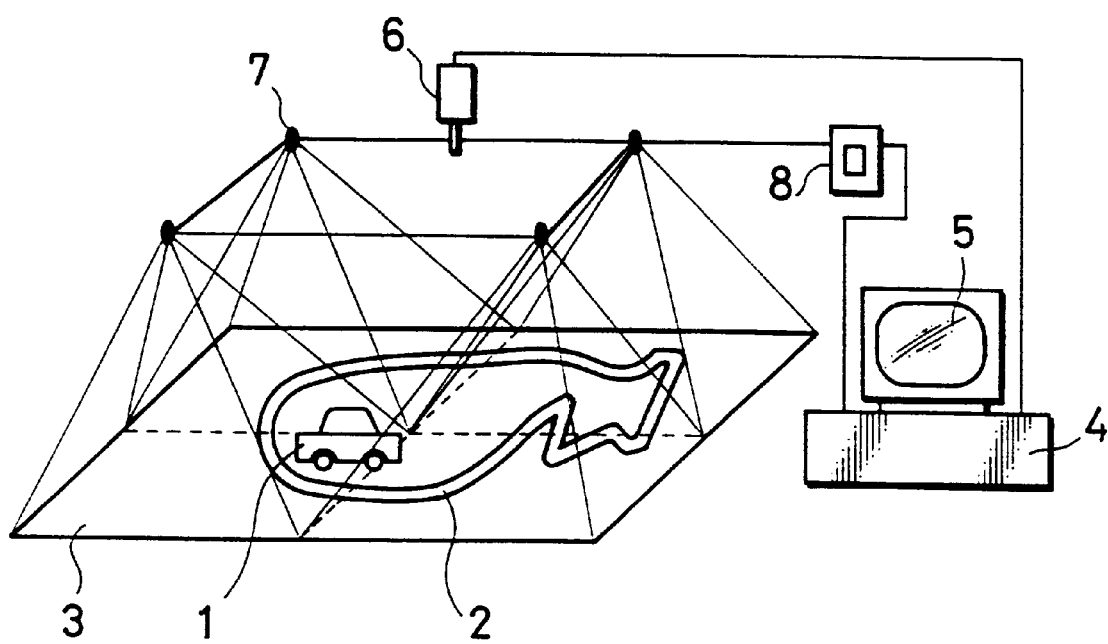
FIG. 1 is a perspective view showing an overall construction of a game machine embodying the present invention.
Figure 2:
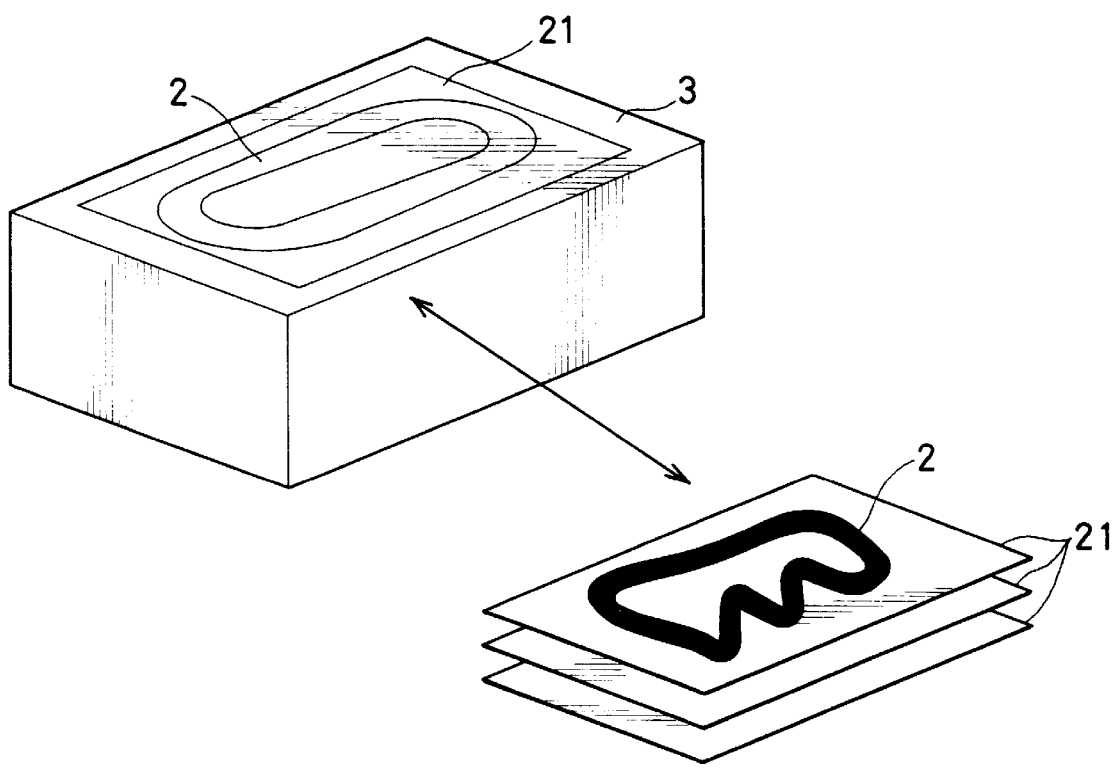
FIG. 2 is a perspective view showing an embodiment of a base for the game machine.
Figure 3:
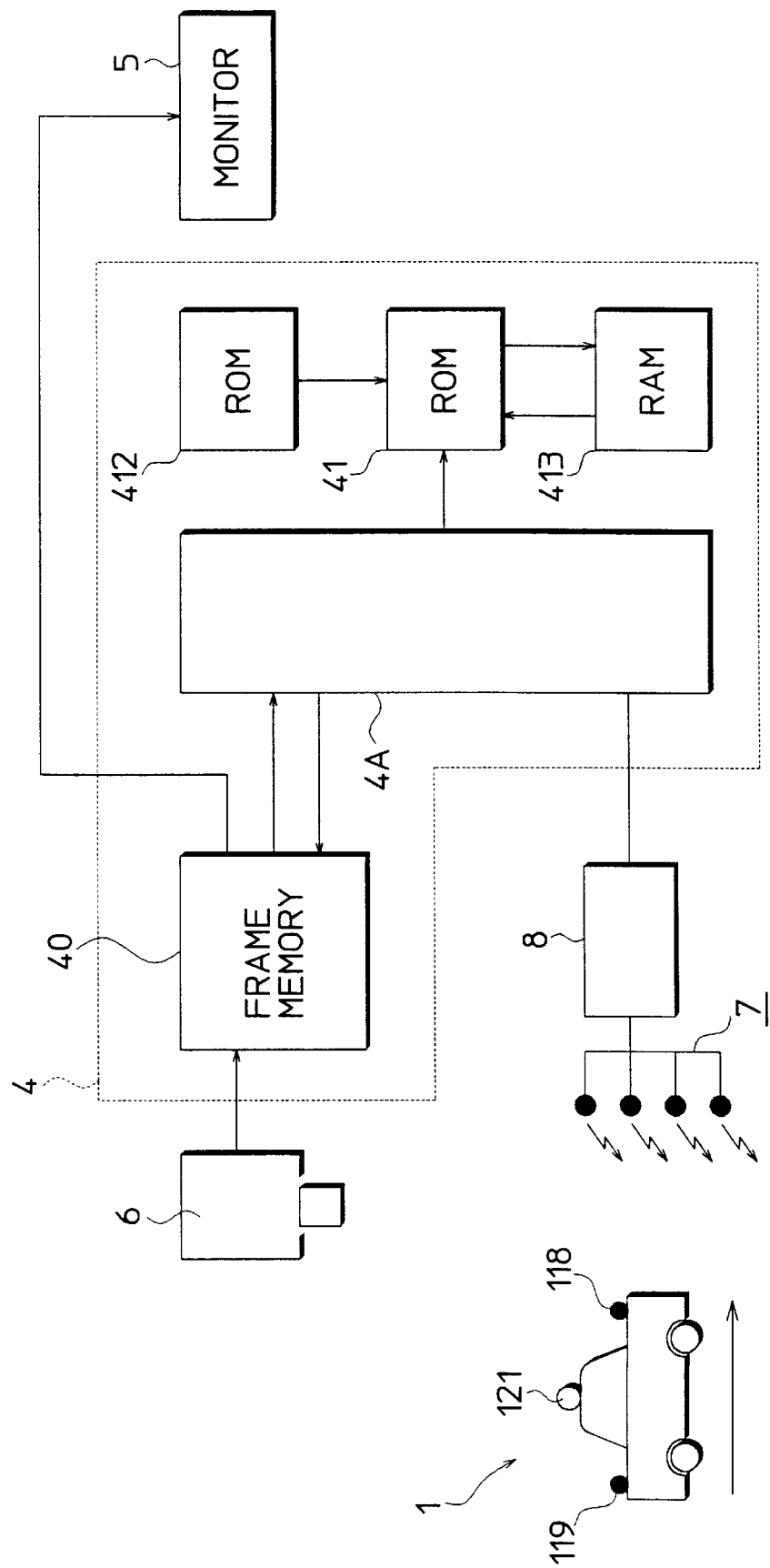
FIG. 3 is a block diagram of the game machine shown in FIG. 1.

FIG. 1 is a perspective view showing an overall construction of a game machine embodying this invention. FIG. 2 is a perspective view of a base for the game machine. FIG. 3 is a block diagram showing the overall construction of the game machine. This game machine includes a car 1 as a movable object and a machine main body. The car 1 has wheels at front and rear sides thereof, and runs on a circuit simulating base 3 on which a race track 2 is drawn.

As shown in FIG. 2, the base 3 has a shape of substantially rectangular parallelepiped, and a track board 21 on a surface of which the aforementioned race track 2 is drawn is detachably mounted on the base 3. In this embodiment, a plurality of track boards 21 are prepared on which the race tracks 2 of different layouts are drawn respectively Replacing the track board 21 which is currently mounted on the base 3 with another track board 21 enables changing the race track 2 along which the car 1 runs.

The respective race tracks 2 are imparted with a unique identification number to render the machine main body recognize the identification number representative of the race track 2 drawn on the track board 21 when the corresponding track board 21 is mounted on the base 3. There are various configurations for allowing the machine main body to recognize the identification number of the race track 2: the track board 21 is printed with a bar code on a specified position thereof, while the base 3 is provided with a bar code reader; the track board 21 is formed with a recess or projection of a specified shape indicative of the respective track boards, while the base 3 is provided with a micro switch or sensor for detecting the recess or projection of the track board 21; and alternatively, in place of the configuration of rendering the machine main body automatically recognize the identification number, an operator may manage the change of race track each time the track board is replaced with another track board.

The machine main body includes a controller 4, a monitor 5, a CCD camera 6 as an area sensor, transmission LEDs (Light Emission Devices) 7 as data transmitter, and a transmission unit 8 provided between the controller 4 and the LEDs 7.

The controller 4 centrally controls the overall operation of this game machine, and is provided internally with a computer (microcomputer) 41 (see FIG. 5), a frame memory 40, electrical circuits as a hardware for detecting the car 1 (referred as 4A in FIG. 3), a ROM (Read Only Memory) 412 in which a game program, course data, and race development data are stored in advance, and a RAM (Random Access Memory) 413 for reading an image in the frame memory 40 during the initialization, temporarily storing the data being calculated, and storing necessary parameters. The controller 4 is also provided with a specified counter. The microcomputer 41 calculates the position, speed and running direction of the car 1 based on the detection result as described later. The construction of the controller 4 is described later in more detail with reference to FIG. 5.

In this embodiment, a plurality of course data are stored in the ROM 412. The course data is such that the position data representing a desired running course on the race track 2 drawn on the base 3 are successively stored at specified periods in the form of H-coordinates and V-coordinates. When there are a plurality of cars 1, the position data corresponding to the respective cars 1 are provided.

Figure 9:
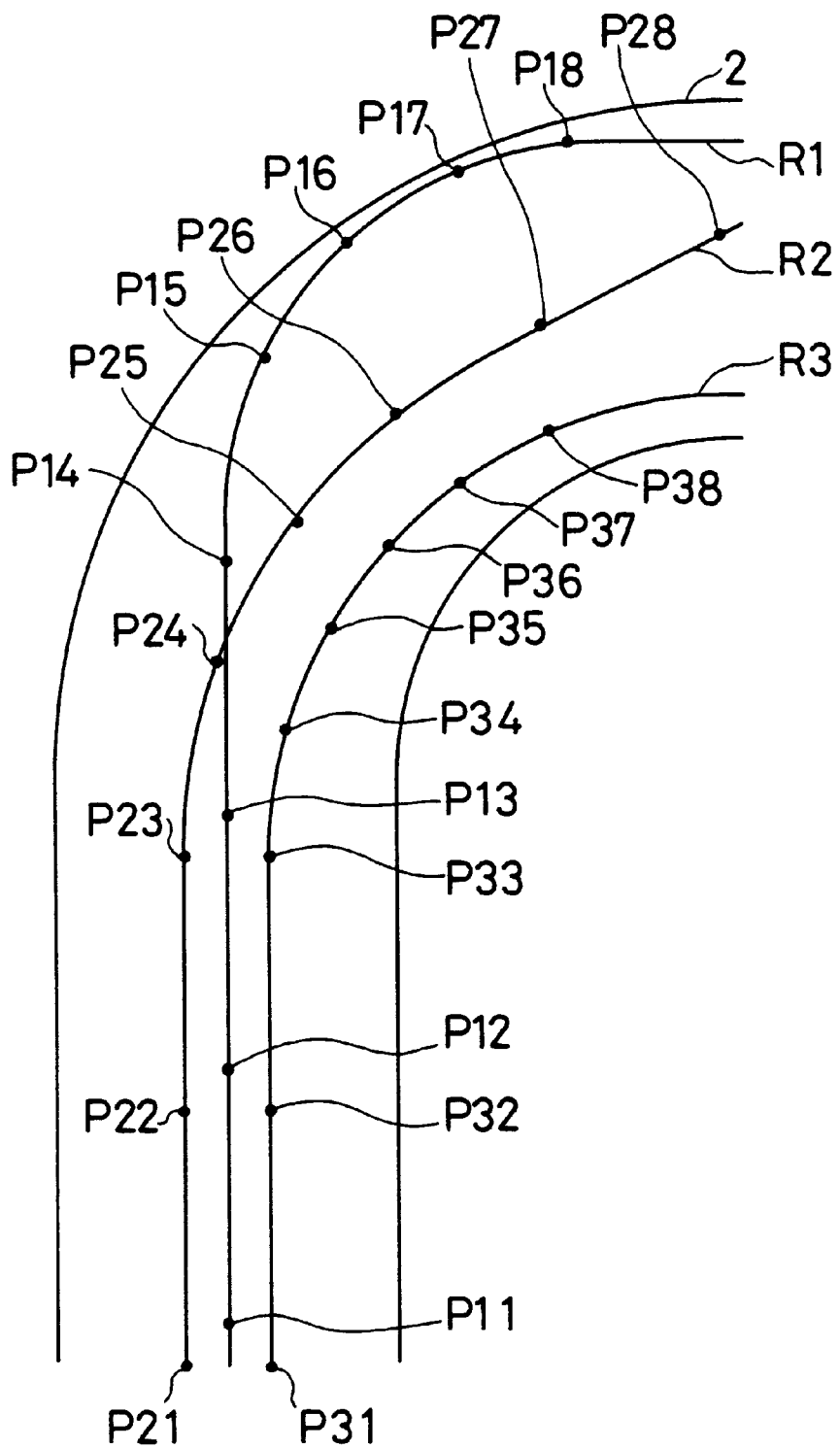
FIG. 9 is a diagram showing an example of a course data.

FIG. 9 is a diagram exemplifying a course data stored in the ROM 412 of the controller 4. In this embodiment, running routes for the respective cars 1 on the race track 2 are designated in advance, and the target positions of the running route for the respective cars 1 at times with certain time interval are stored as course data in the ROM 412. Referring to FIG. 9, there are shown designated routes R1, R2, and R3 for three cars 1A, 1B, and 1C. In the car 1A, target positions P11 to P18 are designated for the route R1; in the car 1B, target positions P21 to P28 are designated for the route R2; and in the car 1C, target positions P31 to P38 are designated for the route R3. In other words, the car 1A is designed to pass the target positions P11 to P18 by a predetermined time interval; the car 1B is designed to pass the target positions P21 to P28 by the same predetermined time interval as the car 1A; and the car 1C is designed to pass the target positions P31 to P38 by the same predetermined time interval as the car 1A and 1B.

The way of designating the target positions, i.e., the method of storing the course data can be arbitrarily set. One of the methods is such that the race track 2 is arranged with H-, V-coordinates intersecting with each other, and a coordinate value corresponding to the respective target positions is stored as course data. It is to be understood that the ROM 412 also stores target speed data of the respective cars 1 passing through the target positions.

In this embodiment, the ROM 412 also stores data concerning race development for the respective race tracks 2. The data concerning the race development decides the ranking. There are a plurality of kinds of race developments. After the start of each race, the race development is decided by means of a random generator, etc. Alternatively, in one race development, the position data may be randomly given to the different cars 1 at the time of the start of each race. The controller 4 grasps the race development set for the cars 1, and gives the respective cars 1 running control signals in conformity with the set race development.

The monitor 5 is not particularly needed during the game, but is adapted to display the detection state of the car 1 during the manufacturing and the maintenance. Though unillustrated, this game machine is provided with a known construction which is generally required for a medal game. This construction includes a device for calculating and displaying odds, a medal slot, a medal detector, a device for allowing game participants to input their predicted rankings, a device for detecting the input rankings, a device for judging whether each car received a prize, a device for calculating the number of medals to be converted and Its converting device, etc.

In the case of one CCD camera 6, it is disposed in a position a specified distance above the substantially center of the base 3 with its image sensing surface faced downward so that the upper surface of the base 3 can be entirely covered by a view of the CCD camera 6. Accordingly, in consideration of a view frame of the CCD camera 6, the shape of the base 3 is preferably square or circular. However, the base 3 can take a variety of shapes other than the above shapes depending upon the shape of the race track and the kinds of the game.

As well-known, the CCD camera 6 includes a multitude of photoelectric conversion elements as solid state imaging devices arranged in a matrix. The CCD camera 6 picks up an image at a selective specified period, e.g., either in a scanning cycle of 1/60 second (one field) or in a scanning cycle of 1/30 second (one frame). Electrical signals converted to have level corresponding to amounts of light received by the respective photoelectric conversion elements are output from the CCD camera 6. The CCD camera 6 used in this embodiment has an infrared transmitter filter disposed on its light receiving surface, so that it receives only the infrared radiations in a specified frequency band. This prevents an erroneous operation caused by external light. A plurality of CCD cameras 6 may be used instead of the single CCD camera 6. In this case, the upper surface of the base 3 may be divided into a plurality of areas and the respective CCD cameras may pick up images in their corresponding areas. In this way, the resolution of the picked up images, i.e., the position detection accuracy can be improved.

The transmission LEDs 7 are light emitting devices for emitting, for example, infrared radiations. Similar to the CCD camera 6, the LEDs 7 are disposed at specified height from the base 3 with the light emitting portions faced downward. The infrared signals from the LEDs 7 are directed at the car 1 running on the race track 2 and propagates while spreading at a specified angle. Only one transmission LED 7 may be disposed in the center position. In order to make the signal transmission reliable, two LEDs may be disposed to cover the respective areas defined by dividing the surface of the base 3 into two parts. In this embodiment, four LEDs are disposed to cover the respective areas defined by dividing the surface of the base 3 into four parts.

With a plurality of LEDs 7, the transmission unit 8 transmits a synchronized light pulse signal to the respective LEDs 7 connected in parallel therewith. Thus, even if the areas covered by the respective LEDs 7 partially overlap, no interference occurs, with the result that the occurrence of the erroneous operation can be prevented. In place of the connecting method shown in FIG. 3, the LEDs 7 may be serially connected, which is simple in its construction, or may be serially connected via drivers (using shield wires) so as to suppress the influence of impedance and to prevent the noise generation. The connecting method shown in FIG. 3 is advantageous as compared with the serial connection in that the influence of impedance is smaller.

Figure 4:
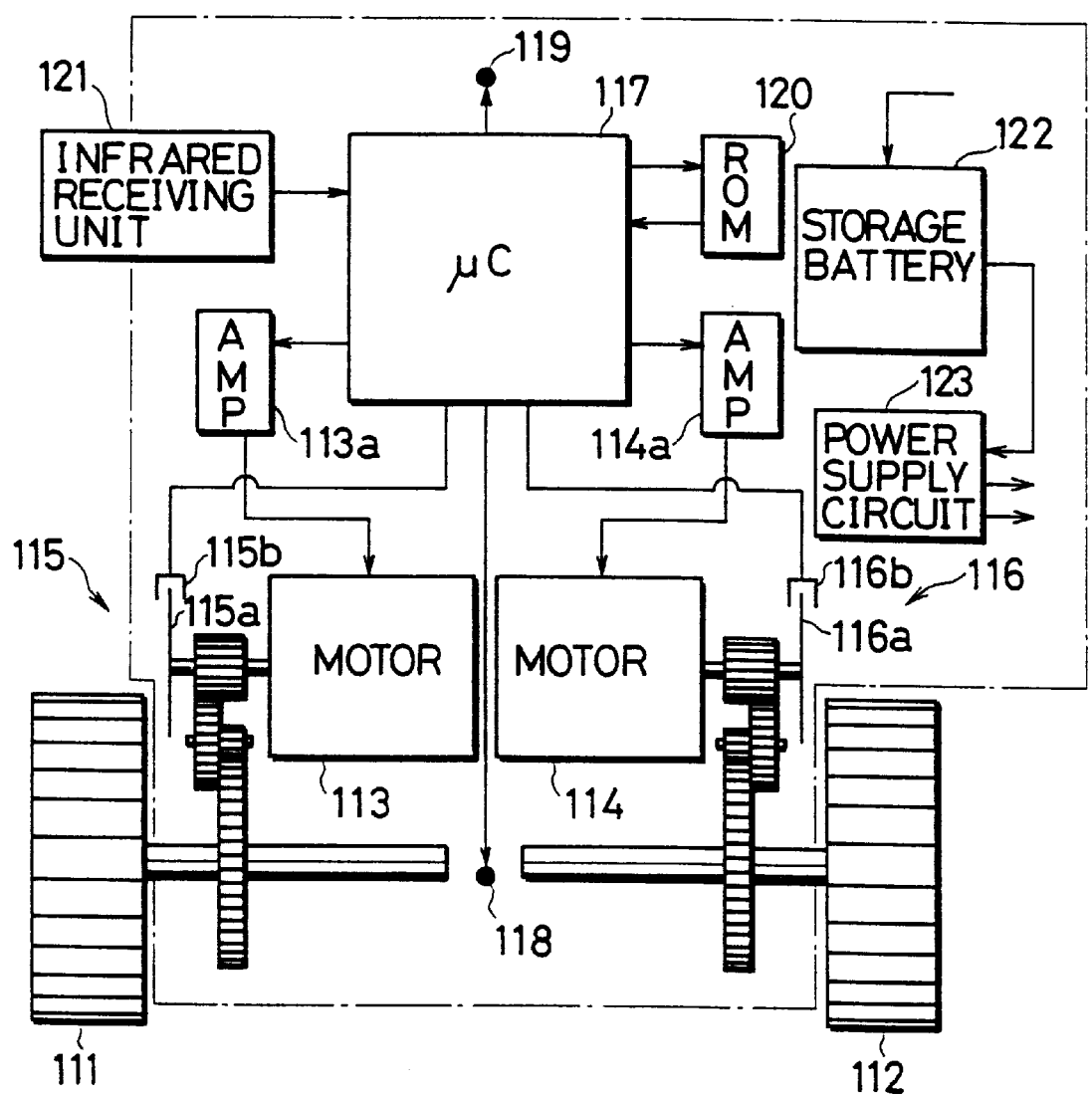
FIG. 4 is a block diagram showing a horizontal arrangement of main parts of a car.

FIG. 4 is a block diagram planarly showing the construction of the car 1.

The car 1 has an unillustrated body, which has a so-called three-point support structure. In other words, wheels 111, 112 are rotatably mounted at the opposite lateral sides of the front side of the car body, and an unillustrated ball (ball caster) is disposed in the center of the rear (or front) side of the car body. This ball is fitted in a partially spherical hole which is formed on the bottom surface of the car body so as to volumetrically accommodate at least the half of the ball. The ball is rollable by 360 degrees. By adopting the three-point support structure, the slip of the car body can be effectively simulated. In place of the ball, rotatable wheels may be mounted at the opposite lateral sides.

The car 1 includes motors 113 and 114 for driving the wheels 111 and 112 formed of resin or like material, respectively. DC motors are used as the motors 113 and 114. The speed of the car 1 is controlled as the revolution of the motors 113 and 114 are duty-controlled and, if necessary, the car 1 is caused to run backward (by inverting the polarity of a supply current). Alternatively, pulse motors capable of controlling the speed by controlling a pulse frequency may be used. A plurality of reduction gears are mounted between rotatable shafts of the motors 113 and 114 and those of the wheels 111 and 112 so that a specified speed range is obtainable. Further, rotating speed detectors 115 and 116 for detecting the rotating speed of the motors 113 and 114, respectively, are provided so as to feedback-control the speed of the car 1. The detectors 115, 116 include rotating plates 115a, 116a formed with perforations at specified intervals in their circumferential direction and which are rotatably mounted on the rotatable shafts of the motors 113 and 114, and photointerrupters 115b, 116b disposed to hold the rotating plates 115a, 116a therebetween to detect the perforations formed in the plates 115a, 116a, respectively.

Indicated at 117 is a one-chip microcomputer as a controller for the car 1. The microcomputer 117 analyzes the signals transmitted from the LEDs 7 of the machine main body to generate a running control signal for the car 1, and causes front and rear LEDs 118 and 119 to emit infrared radiations. Its operation program is stored in a ROM 120. Indicated at 113a and 114a are amplifiers for amplifying the speed control signals output from the microcomputer 117 and sending the amplified signals to the motors 113 and 114, respectively.

As shown in FIG. 3, the front LED 118 is disposed in the center of the front part of the car 1, whereas the rear LED 119 is disposed in the center of the rear part of the car 1. These LEDs 118 and 119 face straight above. The frequency band of the infrared radiations emitted from the LEDs 118 and 119 coincides with the transmission frequency band of the infrared transmitter filter disposed on the front surface of the CCD camera 6. The LEDs 118 and 119 are constructed such that the light emitted therefrom propagate while spreading at a wide angle. Thus, the image of the car 1 in any arbitrary position on the base 3 can be picked up by the CCD camera 6.

Referring back to FIG. 4, indicated at 121 is an infrared receiving unit which includes a photodiode or like device for receiving the light pulse signals transmitted from the LEDs 7. As shown in FIG. 3, the unit 121 is disposed, for example, in the middle of the top of the car 1 with faced upward. This photodiode is, for example, exposed so that it can receive the light from the wide range of directions. Indicated at 122 is a storage battery including a Ni-Cd battery capable of storing and releasing charges. This storage battery 122 is used as a battery for the car 1. Indicated at 123 is a stabilizing power supply circuit for generating, from a voltage from the storage battery 122, a voltage of 5V necessary to operate the microcomputer 119 and a voltage of 6V necessary to operate the motors 113 and 114.

Figure 5:
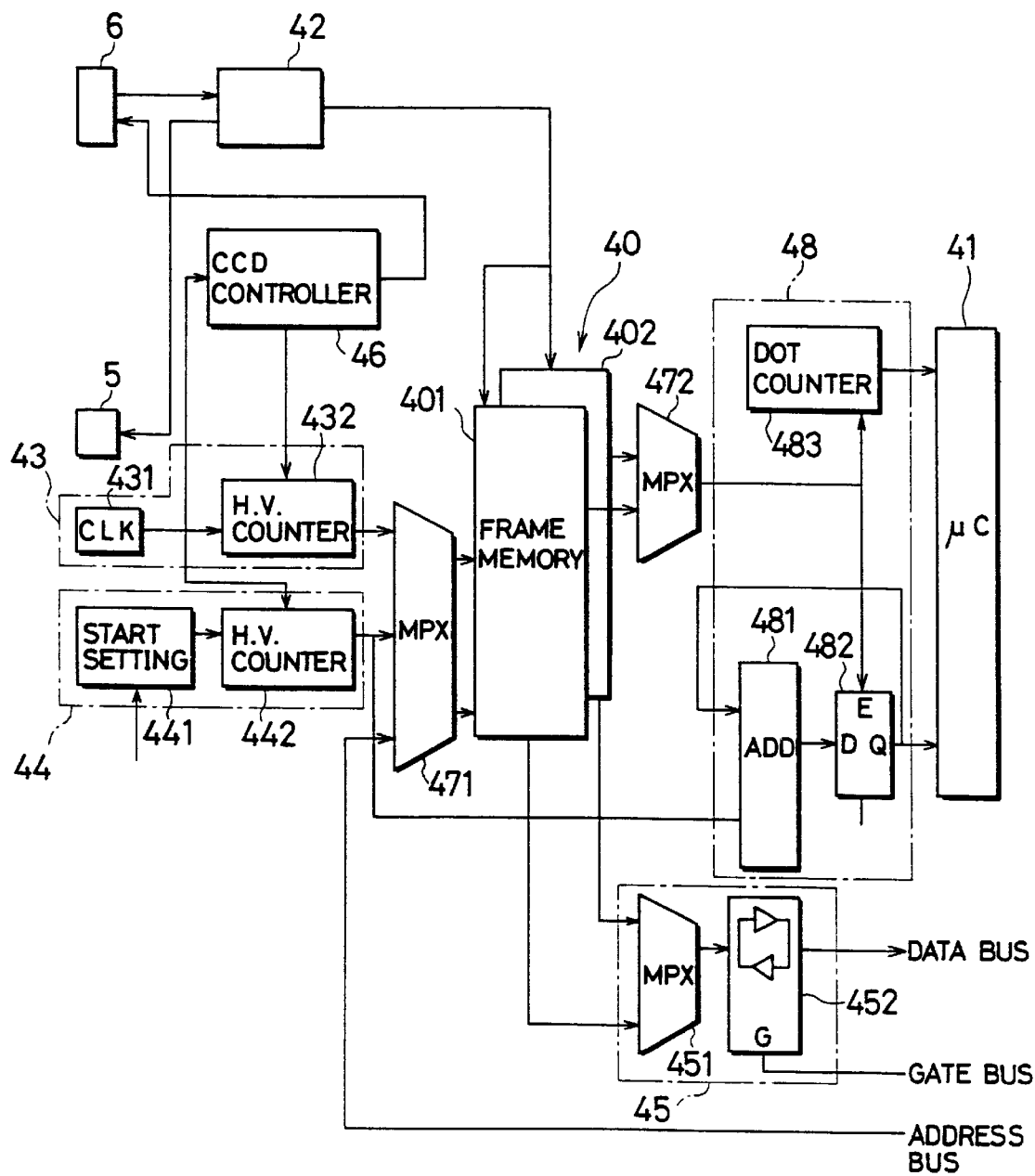
FIG. 5 is a block diagram of a portion of a controller for detecting the position of the car.

FIG. 5 is a block diagram of the portion of the controller 4 where the position of the car 1 is detected.

A binary processing circuit 42 converts an image on the base 3 which is picked up by the CCD camera 6 into a binary data of high and low, and transfers the converted data to the frame memory unit 40. The binary processing circuit 42 is described in detail later with reference to FIG. 6. The frame memory unit 40 includes frame memories 401 and 402 having a storage capacity coinciding with or corresponding to the number of the pixels of the CCD camera 6. The frame memories 401 and 402 are alternately switched in specified cycles to store the image data. This cycle is selected either the field cycle (½ of the frame cycle) or the frame cycle.

Indicated at 43 is a write address generator for generating a write address of the frame memory unit 40. The address generator 43 includes, for example, a reference clock generator 431 for outputting a reference clock pulse of 14 MHz and a H-, V-counter 432 for generating H-, V-addresses. The counter 432 outputs a write address for scanning all the addresses of the frame memory unit 40 at a speed synchronized with the field cycle. The counter 432 is adapted to write the binary data from the binary processing circuit 42 alternately in the frame memories 401 and 402.

Indicated at 44 is a read address generator for generating a read address for a specified area (hereinafter, referred to as a trace block) in the frame memory unit 40. The read address generator 44 includes a start setting circuit 441 for setting a starting position of the trace block, and a H-, V-counter 442. The generator 44 operates after an initial position recognition to be described later, and generates a read address of the trace block based on a start address (Hs, Vs) of the trace block and a trace block size data supplied from the microcomputer 41. In this way, the binary data only within the trace block are read.

Indicated at 45 is a data reading circuit for reading the binary data read in correspondence with the read address of the frame memory unit 40 output from the microcomputer 41 at the time of the initial position recognition, and outputting the read data to the microcomputer 41. The data reading circuit 45 includes a multiplexer 451 and a buffer 452. In the initial position recognition, there is a possibility that the data from the front and rear LEDs 118 and 119 may contain noises. The entire binary data in the frame memory unit 40 are processed by the microcomputer 41. The reading circuit 45 is provided to this end. More specifically, when a PC address is sent from the microcomputer 41, the binary data in the designated addresses are read one after another via the multiplexer 451, and are introduced to the microcomputer 41 via the buffer 452. The buffer 452 is adapted to output a parallel data of, e.g., 8 bits to the PC-address.

A CCD camera controller 46 generates a synchronization signal and a camera synchronization signal in accordance with the reference clock signal from the reference clock generator 431. In accordance with these synchronization signals, the frame memories 401 and 402 are switched, and the cycle and timing of the scanning by the CCD camera 6 are synchronized with the generation of the addresses of the frame memory.

Indicated at 471, 472 are multiplexer as switching circuits. The multiplexer 471 suitably switches the addresses from the counters 432, 442 and the PC-address from the microcomputer 41 and sends it to the frame memory unit 40. The multiplexer 472 switches outputs from the frame memories 401 and 402.

Indicated at 48 is a data accumulating circuit which includes an adding circuit 481, a latch circuit 482, a dot counter 483. The accumulation result is sent to the microcomputer 41, which in turn calculates the position of the car 1, the trace block and the running control data based on the received accumulation result.

Figure 6:
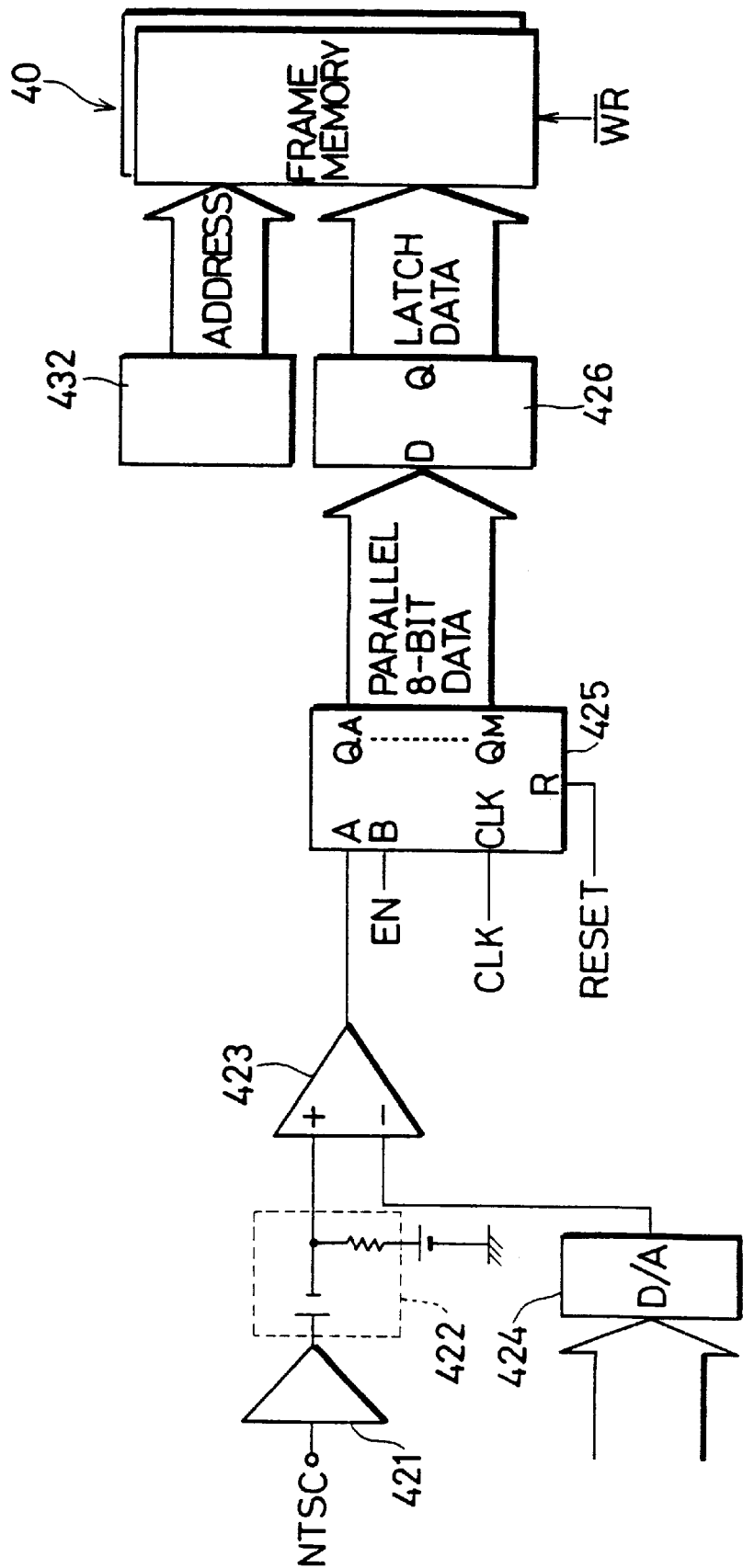
FIG. 6 is a detailed circuit diagram of a binary processing circuit.
Figure 7:
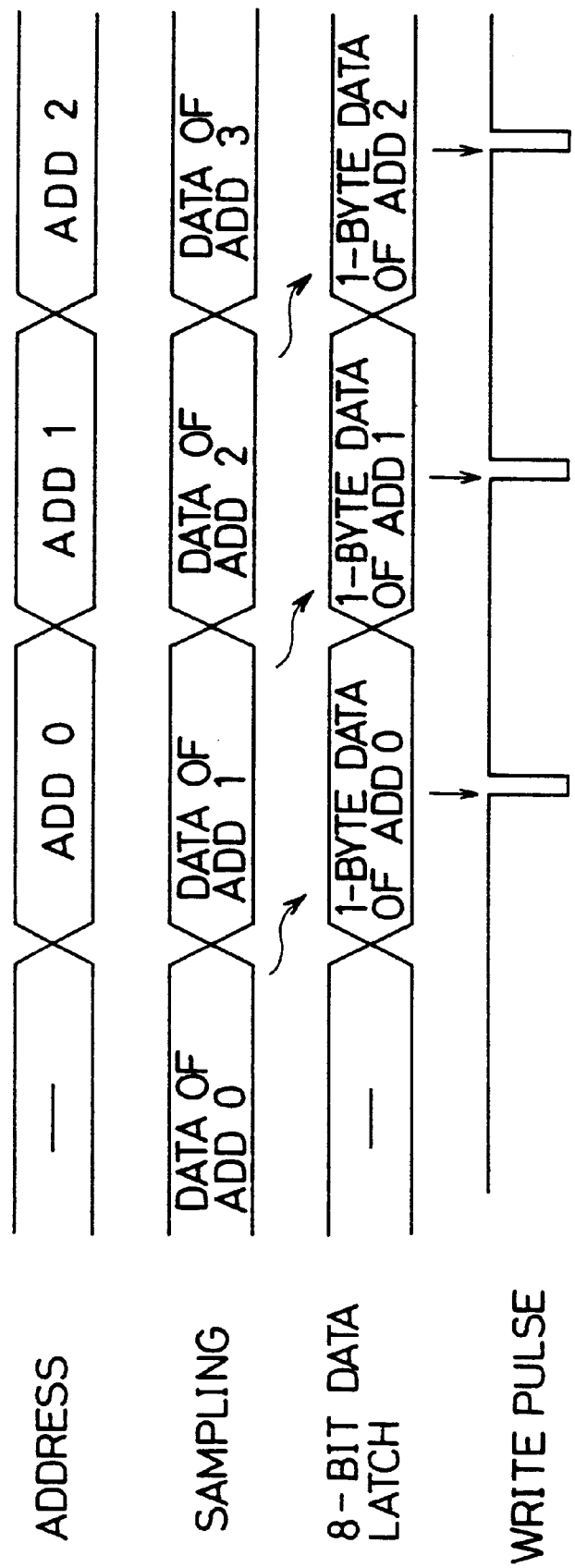
FIG. 7 is a timing chart showing an operation of the circuit shown in FIG. 5.

FIG. 6 is a detailed circuit diagram of the binary processing circuit 42, and FIG. 7 is a timing chart showing its operation. In FIG. 5 indicated at 421 is an amplifier for amplifying an NTSC signal including image data from the CCD camera 6, and the thus amplified signal is converted into a signal having a specified voltage level by a circuit 422 including an AC coupling circuit. The thus converted signal is output to a noninverting input terminal of a comparator 423 including an operational amplifier. A D/A converter 424 is a digital-to-analog converting circuit and is adapted to convert a threshold data of, e.g., 8 bits input from the microcomputer 41 into an analog signal and to output the resultant signal to the inverting input terminal of the comparator 423. The comparator 423 outputs a signal of high level if the level of the NTSC signal is a threshold level or higher, and the output data thereof is sent to a serial parallel converter 425. The serial parallel converter 425 converts the received binary data into a data consisting of 8 bits in synchronization with a sampling clock and outputs the converted data to a latch circuit 426. The latch circuit 426 latches and outputs this signal to the frame memory unit 40. The binary parallel data is written in the frame memory 40 at a timing when a write pulse (bar WR) output during the reading of the data for 8 pixels is sent.

Accordingly, as shown in FIG. 7, the data is written such that the pixels of the CCD camera 6 correspond to the addresses of the frame memory unit 40: the data from the first pixel (data of ADD0) is written in an address ADD0, a data of ADD1 in an address ADD1, a data of ADD2 in an address ADD2, and so on. The employment of the D/A converter 424 in the binary processing circuit 42 to compare the levels in an analog manner enables the use of a threshold data consisting of a larger number of bits as compared with a conventional case where the digital data are compared for the NTSC signal in the high frequency band. Thus, the resolution of the level comparison can be advantageously enhanced. It will be appreciated that the invention does not deny the employment of the conventional circuit construction for comparing the digital data, and that either one of the constructions is employed in view of a required resolution accuracy.

Figure 8A:
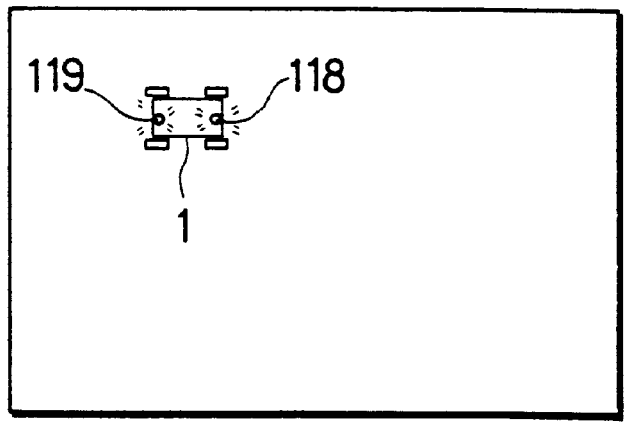
FIGS. 8A to 8C show an operation of a data reading circuit, FIG. 8A showing a base located within a view of a CCD camera, FIG. 8B showing storage contents of a frame memory in the state shown in FIG. 8A, and FIG. 8C enlargedly showing a trace block BL1.
Figure 8B:
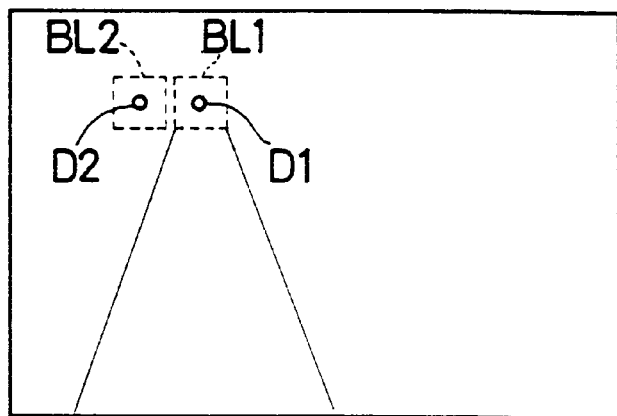
Figure 8C:
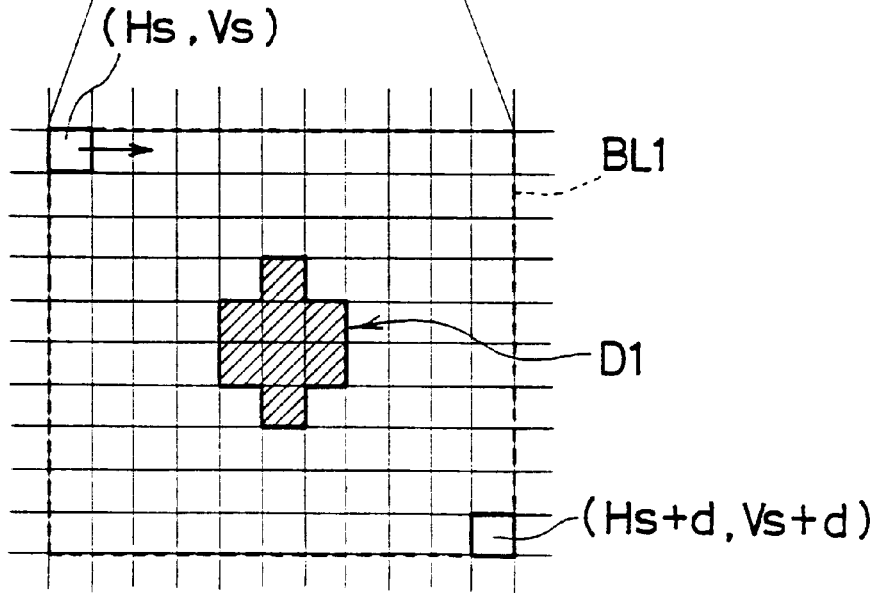

FIGS. 8A to 8C are diagrams showing the operation of the data reading circuit 48, FIG. 8A showing a base located within a view of a CCD camera, FIG. 8B showing storage contents of a frame memory in the state shown in FIG. 8A, and FIG. 8C enlargedly showing a trace block BL1.

In FIG. 8A, one car 1 is located on the base 3, and the front and rear LEDs 118 and 119 are on. In FIG. 8B, LED pixel data D1 and D2 corresponding to the front and rear LEDs 118 and 119 are stored at high level. BL1 and BL2 denote trace blocks.

In FIG. 8C, checkers within the trace block BL1 represent the pixels of the CCD camera 6, i.e., the respective addresses of the frame memory unit 40. In this embodiment, there is adopted a square trace block having a side which is at least twice as long as a distance the car 1 moves in one field cycle (half the frame cycle). In this way, the movement of the car in 360° directions can be more securely traced. The upper left end (Hs, Vs) of the trace block BL1 is a starting address of the trace block BL1, which is set by the start setting circuit 441. The H-, V-counter 442 designates the addresses in a row direction (a direction indicated by an arrow in FIG. 8C) from the starting address (Hs, Vs), i.e., (Hs+1, Vs), . . . , (Hs+d, Vs). Upon the completion of one row, the address proceeds to the next row. The address designation ends at an end address (Hs+d, Vs+d). In this way, the trace block BL1 of d×d is designated.

By selecting the shape of the lens disposed on the sensing surface of the CCD camera 6 and the shape and luminance of the front and rear LEDs 118 and 119, the LED data D1 may be stored over a plurality of addresses (as in a hatched portion in FIG. 8C). By obtaining a plurality of dots, the LED data can be made distinguishable from other noises.

The integration is described with reference to FIGS. 5 and 8C. Upon the address designation of the trace block BL1 from the read address generator 44, stored contents of the addresses are successively read from the frame memory 401 (or 402). Simultaneously, the read addresses are sent to the adding circuit 481.

Each time one dot (high level data) as the LED data D1 is read from the frame memory 401, the count value of the dot counter 483 is incremented and the read dot is sent to the latch circuit 482. Only when receiving the dot data, the latch circuit 482 latches the address value output from the adding circuit 481 and sends the address value back to the adding circuit 481. In this way, each time the dot data is output from the frame memory 401, the address value for storing this dot data is output to the adding circuit 481 and integrated therein.

As a result, the number of dots existing in the trace block BL1 and the integration value of the addresses for these dots are obtained in the dot counter 483 and the latch circuit 482, respectively. Upon the completion of the address designation of the trace block BL1, the microcomputer 41 reads the data obtained in the latch circuit 482 and the dot counter 483, and discriminates based on the dot number whether the data is a LED data or a noise. A center address (Hc, Vc) of the dots is calculated by dividing the integration value by the dot number. The center address is assumed to be the position of the front LED 118. In accordance with this position data, the trace block is set and the running control signal for the car is generated.

The discrimination as to whether the data is a LED data or a noise may be made as follows. A threshold dot number is set, and the data having the dot number which is not smaller than the threshold value is discriminated to be the LED data. Alternatively, the threshold value or level of the binary processing circuit 42 may be gradually increased while the LEDs are turned off, and the threshold level where the natural light can be completely cut may be set as a threshold value.

Further, the center address may be calculated by the hardware, and the H-, V-coordinates calculation results may be sent to the microcomputer 41. Instead of the use of absolute coordinates in calculating the integration value of the coordinates, relative coordinates from reference coordinates may be used. In this case, target coordinates are obtained by adding the reference coordinates to the obtained relative coordinates at the end. This is advantageous in that the number of bits to be used is reduced and the addition by the hardware can be performed at a higher speed.

Figure 10:
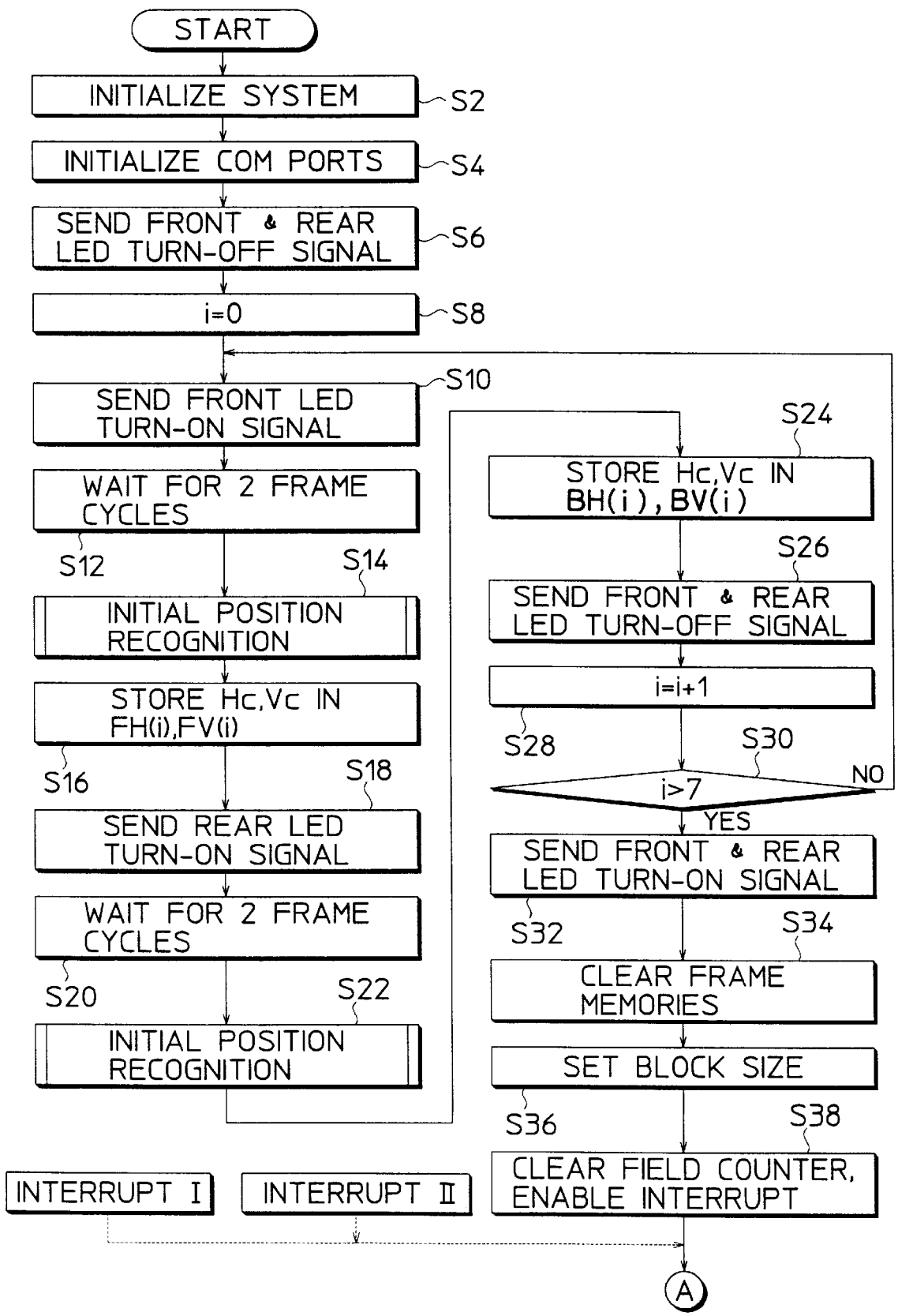
FIGS. 10 and 11 are flowcharts showing a main routine of the game machine.
Figure 11:
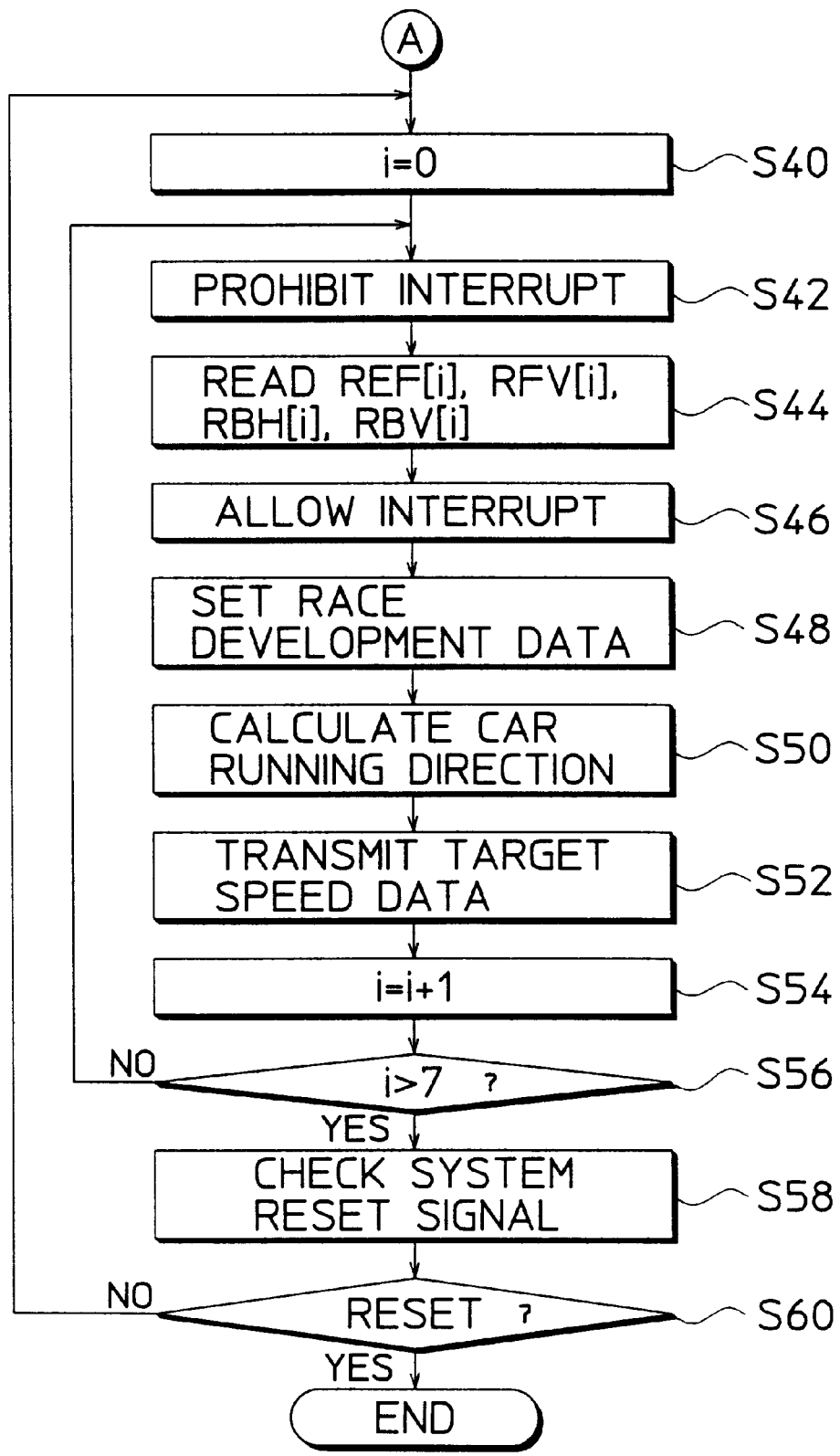

FIGS. 10 and 11 are a main flowchart showing the operation of the game machine incorporating the inventive system for controlling the movable object. In this game machine, e.g., 8 cars are used and identification numbers ID No. i (i=0 to 7) are given in advance to the respective cars 1 by setting dip switches provided therein.

This flowchart starts after the specified operation, e.g., insertion of a medal, or input of a predicted ranking is detected and the race development is set. First, the entire system is initialized, and communication ports of the microcomputer 41 are initialized (Steps S2 and S4). In setting the race development, firstly, the recognition of identification number of the race track 2 is performed (the recognizing method has been described before). After the recognition, the data concerning race development of the race track 2 corresponding to the recognized identification number is read out from the ROM 412 to randomly select a race development based on the read out data.

Subsequently, command signals are generated to turn off the front and rear LEDs 118 and 119 of all the cars 1, and are sent to all the cars 1 via the transmission LEDs (Step S6).

A count value i of the counter is set to 0 (Step S8), and a command signal is generated to turn on the front LED 118 of the car of ID No. 0, and is transmitted to this car via the transmission LEDs 7 (Step S10). The microcomputer 117 of the car of ID No. 0 recognizes that the transmission command is directed to it, and turns only the front LED 118 on. On the other hand, after waiting for a time which is required for the luminance of front LED 118 to reach a specified level, e.g., for a time corresponding to 2 frame cycles following the transmission of the command signal (Step S12), the microcomputer 41 calculates the center of gravity position to recognize an initial position of the front LED 118 of the car of ID No. 0 (Step S14). This center of gravity position calculation is described in detail later. The obtained center of gravity data (Hc, Vc) is stored in the form of FH[i], FV[i] (F denotes forward) in a RAM or the like as a buffer (Step S16).

Upon the completion of the storage of the center of gravity data, a command signal is generated to turn on the rear LED 119 of the car of ID No. 0, and is transmitted to this car via the transmission LEDs 7 (Step S18). The microcomputer 117 of the car of ID No. 0 recognizes that the transmission command is directed to it, and turns only the rear LED 119 on. On the other hand, after waiting for 2 frame cycles following the transmission of the command signal (Step S20), the microcomputer 41 calculates the center of gravity to recognize an initial position of the rear LED 119 of the car of ID No. 0 (Step S22). The obtained center of gravity data (Hc, Vc) is stored in the form of BH[i], BV[i] (B denotes back) in a RAM or the like (Step S24). Upon the completion of the storage of the center of gravity data of the front and rear LEDs 118 and 119, command signals are generated to turn off the front and rear LEDs 118 ad 119 of the car of ID No. 0 and are sent to this car via the transmission LEDs 7 (Step S26). Consequently, the front and rear LEDs 118 and 119 of the car of ID No. 0 are turned off.

Subsequently, the count value of the counter i is incremented by 1 (Step S28) and it is discriminated whether the count value i is in excess of 7 (Step S30). If i≦7 (NO in Step S30), this routine returns to Step S10 to carry out the aforementioned operations to the car of ID No. 1, . . . , the car of ID No. 7. The center of gravity data for the respective cars are thus obtained and stored. If i>7 (YES in Step S30), the command signal is generated to turn on the front and rear LEDs 118 and 119 of all the cars of ID No. 0 to 7 and is sent to all the cars via the transmission LEDs 7 (Step S32).

Upon the completion of the initialization, the tracing is prepared. First, the frame memories 401 and 402 are cleared (Step S34), and the size of the trace block is set (Step S36). Then, a field counter for switchingly designating the frame memories 401 and 402 is cleared to enable an interrupt, and this routine waits for an interrupt (Step S38).

Figure 12:
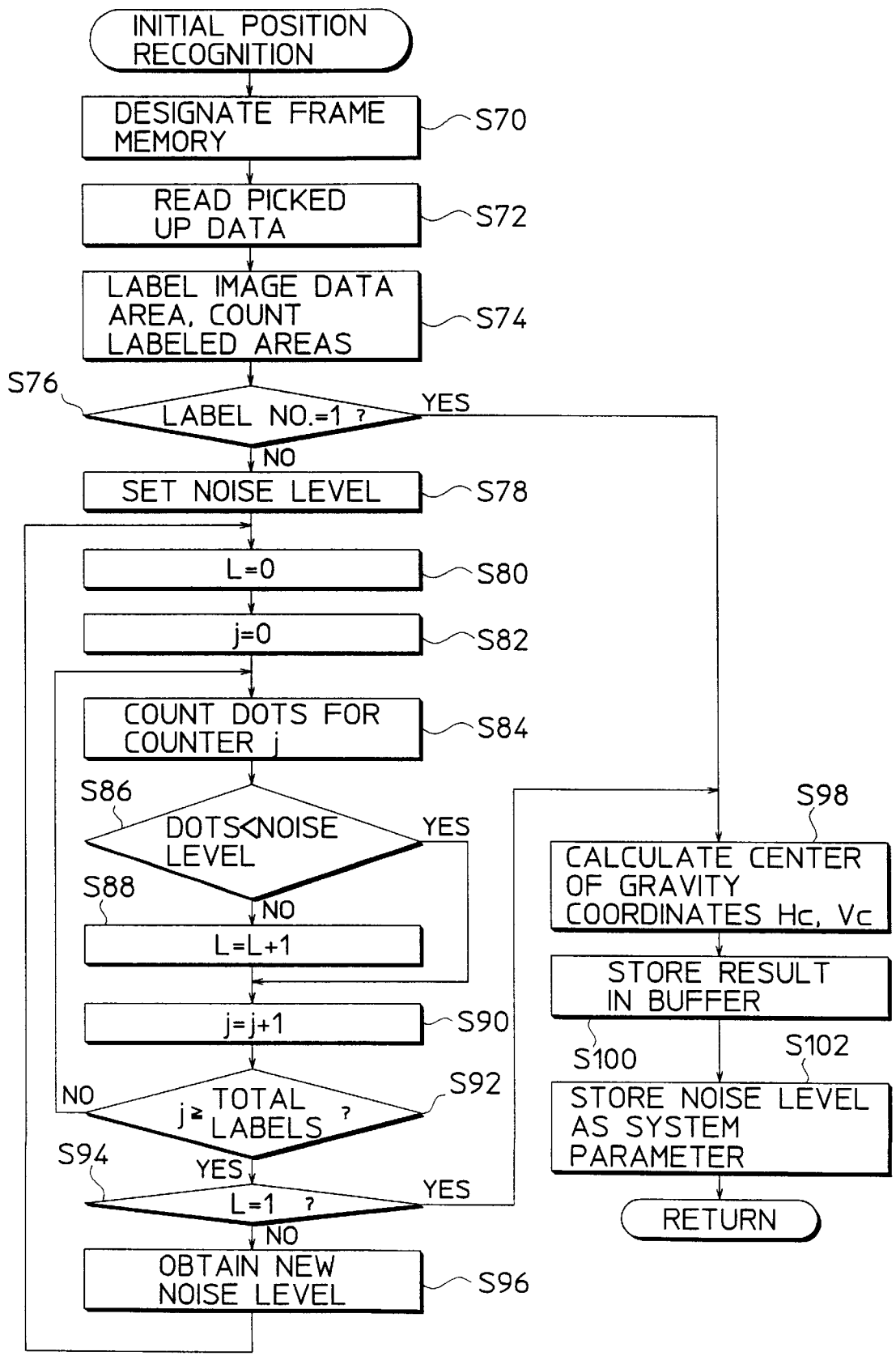
FIG. 12 is a flowchart showing a subroutine "Initial Position Recognition"

FIG. 12 is a flowchart showing a subroutine "Initial Position Recognition" carried out in Steps S14 and S22.

As described later, in tracing the cars 1, the processing is carried out in the data accumulating circuit 48 upon an interrupt. The center of gravity position calculation in the initial position recognition in Steps S14 and S22 is performed in this subroutine in order to securely prevent an erroneous calculation resulting from the presence of unnecessary reflection light, and the like.

First, the frame memory is designated (Step S70), and the picked up image data is read in the RAM of the microcomputer 41 (Step S72). The microcomputer 41 scans the read image data; detects the continuity of the dots (high level data) using a known method; labels the respective areas where the continuity is found; counts the labeled areas; and stores the counted label number (Step S74).

Subsequently, it is discriminated whether the label number is 1 (Step S76). If the label number is 2 or greater (NO in Step S76), a noise level value in a system parameter is set (Step S78). The effective label number counter L and the label counter j are set to 0, respectively (Steps S80 and S82). The dots are counted for the label corresponding to the count value O of the label counter j (Step S84). It is then discriminated whether the counted dot number is below the noise level (Step S86). If the dot number is not smaller than the noise level (NO in Step S86), the effective label counter L is incremented by 1 (Step S88) upon the assumption that this label is an effective label, and this subroutine proceeds to Step S90. Unless otherwise (YES in Step S86), this routine directly proceeds to Step S90 in which the label counter j is incremented. It is then discriminated whether the count value of the label counter j has reached the total label number (Step S92). Unless the count value of the counter j has reached the total label number (NO in Step S92), this routine returns to Step S84 to detect the number of the effective labels. If the count value of the counter j has reached the total label number (YES in Step S92), it is discriminated whether the count value of the counter L is 1 (Step S94). If the count value of the counter L is in excess of 1 (NO in Step S94), a now noise level having a higher threshold level which is obtained by adding 1 to the previous noise level upon the assumption that noises are still included (Step S96). Thereafter, this subroutine returns to Step S80 to carry out the aforementioned operations. This subroutine proceeds to Step S98 when the count value of the counter L becomes 1. In Step S98, the center of gravity coordinates Hc, Vc are calculated assuming that one effective label is the front LED 118 (or the rear LED 119), and the calculation result is stored in the buffer (Step S100). The center of gravity coordinates (Hc, Vc) are calculated from the following equation: Hc=a total value in H-coordinates/dot number, Vc=a total value in V-coordinates/dot number. The noise level at this stage is stored as a system parameter (Step S102), and this subroutine returns.

In Step S76, on the other hand, if the label number is 1 (YES in Step S76), the center of gravity coordinates Hc, Vc are calculated assuming that one effective label is the front LED 118 (or the rear LED 119) (Step S98), and the calculation result is stored in the buffer (Step S100). The noise level at this stage is stored as a system parameter (Step S102), and this subroutine returns.

FIG. 11 is a flowchart showing the operations carried out in response to Interrupts I and II, particularly after the interrupt is enabled in Step S38.

Figure 13:
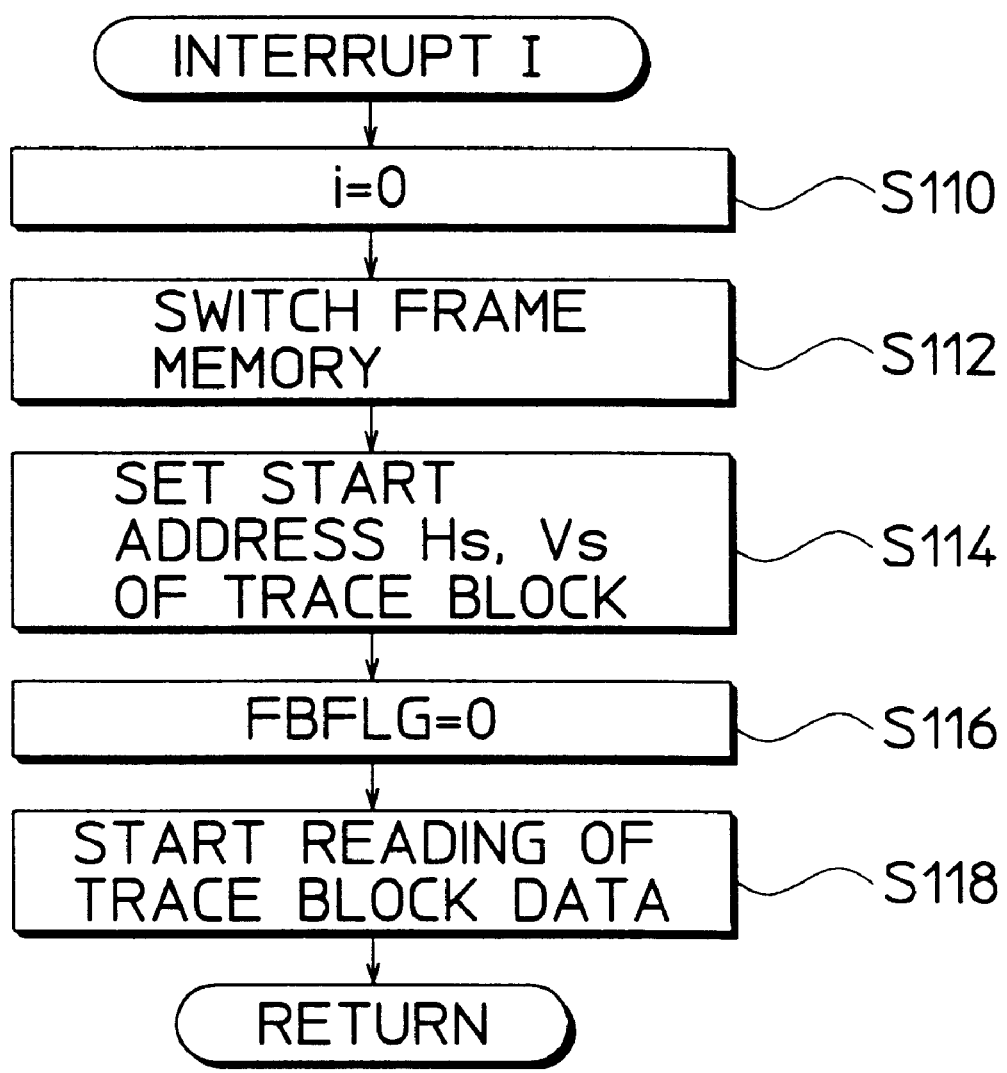
FIG. 13 is a flowchart showing a subroutine "Interrupt I"

The Interrupt I is described with reference to FIG. 13. The Interrupt I is started in response to an interrupt signal generated each time the reading of the image data in the frame memory 401 (or 402) is completed. First, the identification number ID No. i is set to 0 (Step S110), and the frame memory is switched to the one in which the image data are written (Step S112). Subsequently, the start address (Hs, Vs) of the trace block labeled in correspondence with the car of ID No. 0 is set (Step S114). In other words, $$Hs=FH[i]-(\text{trace block size}/2)+\text{correction amount}$$

$$Vs=FV[i]-(\text{trace block size}/4)+\text{correction amount}$$

The correction amount is given by implementing the flowchart of Interrupt II.

A quotient is set at 4 in the address Vs in view of the fact that there is ½ scanning line although the image stored in the frame memory is read as a binary data by the frame. In this way, a square trace block can be obtained.

The values Hs, Vs are output to the start setting circuit 441. A flag FBFLG for indicating either one of the front and rear LEDs 118 and 119 is set to 0, i.e., the start address is set at the front LED 118 (Step S116). This routine returns after the reading of the data within the trace block is started (Step S118). The reading of the data for the front LED 118 of the car 1 of ID No. 0 is carried out in the data accumulating circuit 48.

By setting the start address (Hs, Vs) such that the position of the LED 118 (or 119) is located in the center of the trace block, the movement of the car 1 can securely be traced after one frame cycle independently of the running direction of the car 1, in other words, independently of the car 1 running in any angle: in 360 degrees over the plane.

Particularly, since the correction amount set based on the running speed and the direction factor is considered as described later, the tracing can be made more secure.

Instead of setting a specified traceable correction amount based on the preset highest speed of the car 1, the correction amount may be changed real-time depending upon the present running speed of the car 1 (obtained by dividing a difference between the detected positions in the last 2 frames by the frame cycle). This enables the front and rear LEDs 118 and 119 to be located as close to the center of the trace block as possible, thereby preventing the tracing error.

Figure 14:
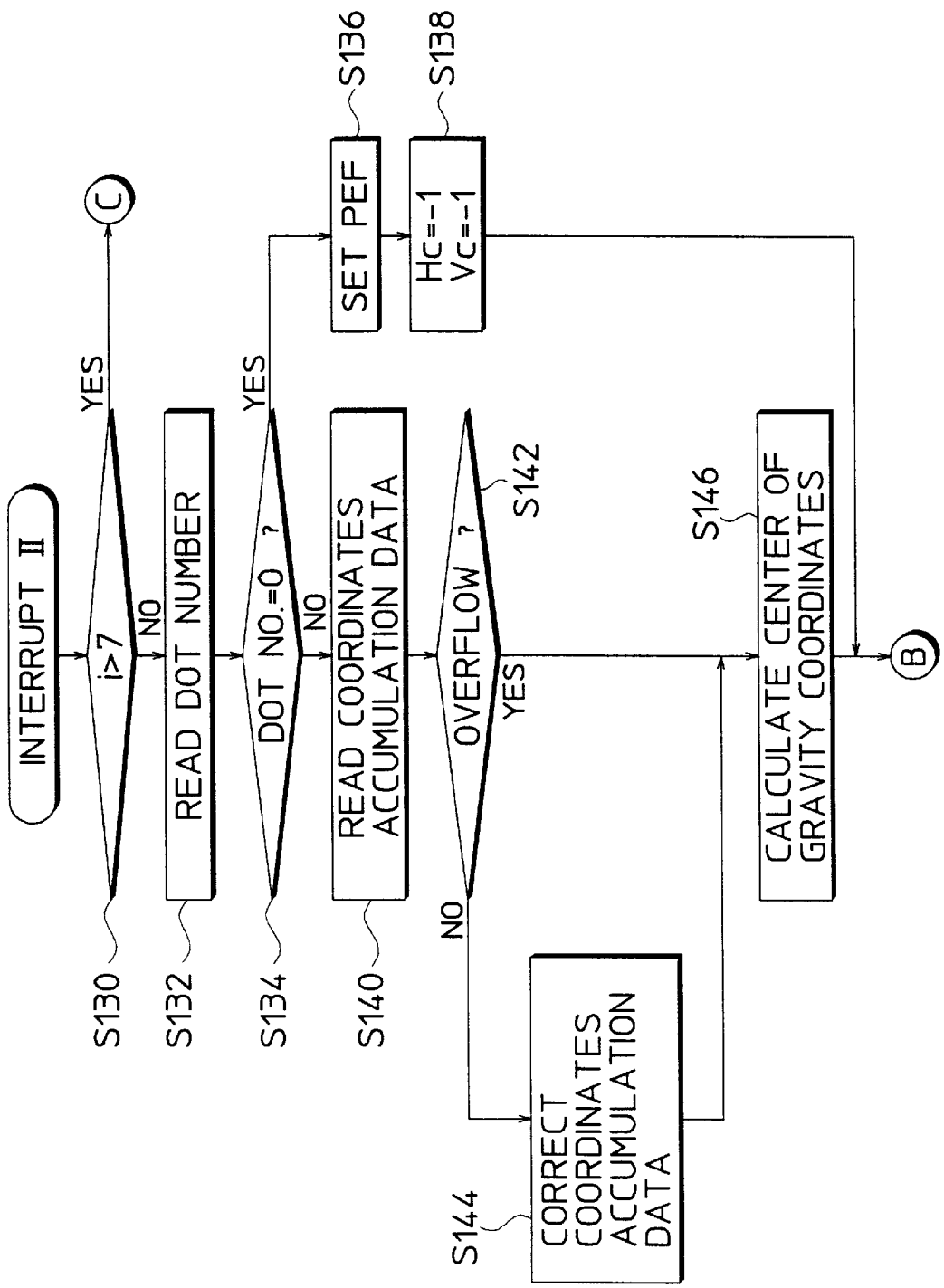
FIGS. 14 and 15 are flowcharts showing a subroutine "Interrupt II"
Figure 15:
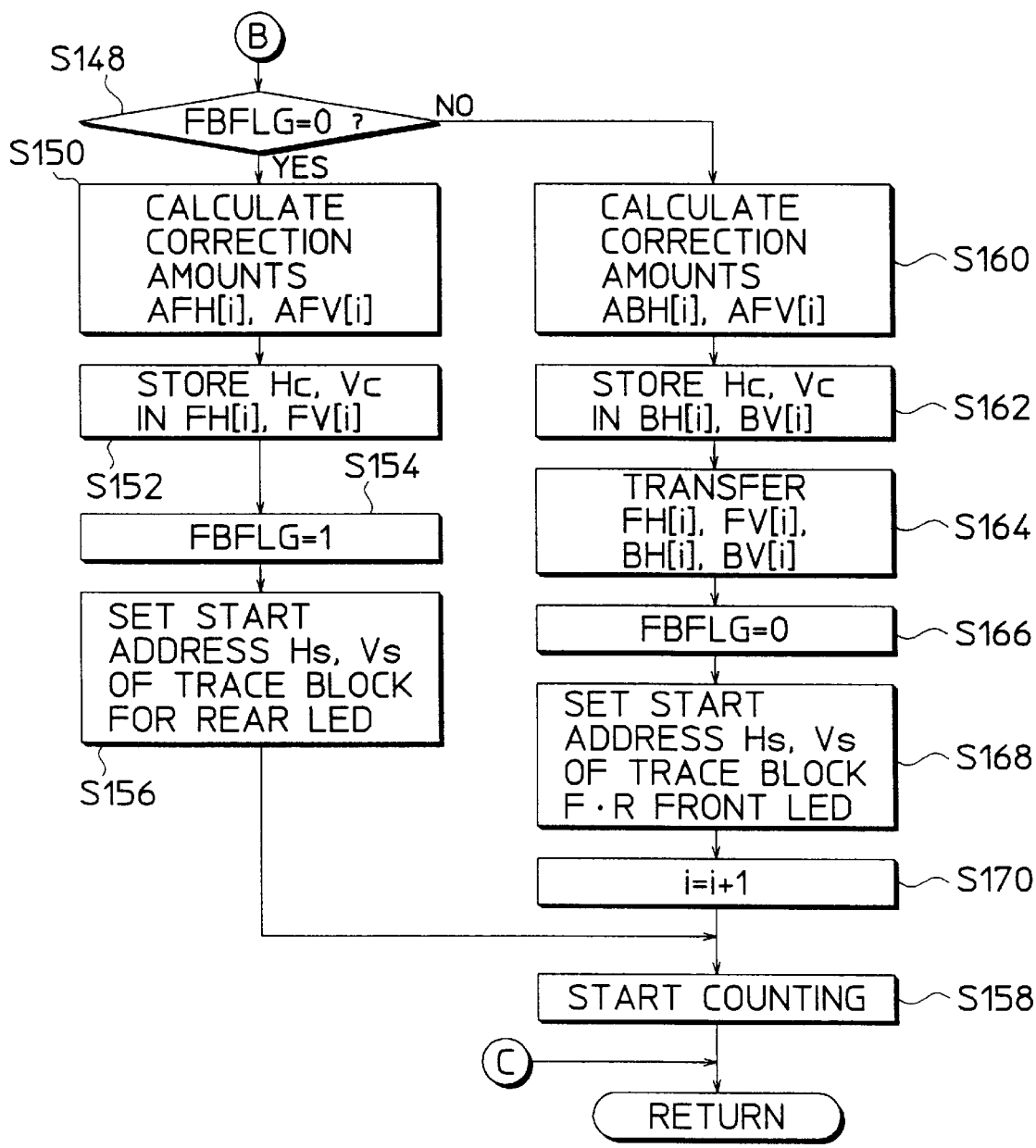

FIGS. 14 and 15 are flowcharts showing the Interrupt II.

The Interrupt II is started in response to an interrupt signal generated each time the address designation of the trace block by the H-, V-counter 442 is completed. First, it is discriminated whether the count value of the counter I is smaller than 7 (Step S130). If this count value is not smaller than 7 (YES in Step S130), this routine returns upon the judgment that the tracing has been completed within one frame.

If the count value of the counter i is smaller than 7 (NO in Step S130), the dot number is read from the dot counter 483 (Step S132). It is then discriminated whether the dot number is 0 (Step S134). If the dot number is 0, a position tracing error flag PEF is set (Step S136), and (Hc, Vc)=(−1, −1) are set as a specific position data (Step S138). A position tracing error can be confirmed by this data or by monitoring the error flag PEF, and an alarm is given upon detecting the tracing error. Alternately, the trace block may be made larger than a predetermined size in case of such errors, so that the tracing can be further continued.

On the other hand, if the dot number is not 0, the coordinates accumulation data in the H- and V-directions are read from the latch circuit 482 upon the assumption that the tracing was completely made (Step S140). At this time, if the latch circuit 482 undergoes an overflow (NO in Step S142), the coordinates accumulation data are corrected (Step S144). This correction is made, for example, based on the previous center of gravity position of the LED 118 (or 119) and the running speed of the car 1, probably considering the fact that the coordinates value is large to the extent that the latch circuit 482 undergoes the overflow. On the other hand, unless the latch circuit 482 undergoes the overflow, the center of gravity coordinates in the H-, V-coordinate system are calculated based on the following equation: Hc=accumulated value in the H-direction/dot number and Vc=accumulated value in the V-direction/dot number (Step S146). It is then discriminated whether the front and rear flag FBFLG is reset (Step S148).

If the flag FBFLG is reset (YES in Step 148), it means that the position of the front LED 118 is to be detected. Accordingly, correction amounts AFH[i], AFV[i] for the trace block in the H-, and V-directions are calculated based on the Hc, Vc calculated in Step S146 and the previously calculated value FH[i], FV[i]: AFH[i]=a moved amount in the H-direction×α, AFV[i]=a moved amount in the V-direction×β (Step S150). The moved amounts in the respective H- and V-directions are obtained: FH[i]−Hc, FV[i]−Vc. Correction coefficients α,β are any values between 0 and 1, and are set to specified values in view of the set speed of the car 1, the size of the trace block, etc.

The values Hc, Vc are stored in FH[i], FV[i] corresponding to the front LED 118 (Step S152). Upon the completion of the storage, the flag FBFLG is set to 1, i.e., the starting address is set at the rear LED 119 (Step S154). Thereafter, the start address (Hs, Vs) of the trace block for the rear LED 119 is set (Step S156). In other words, the start address (Hs, Vs) is set using the following equation:

$Hs = BH[i]$−(trace block size/2)+correction amount $Vs = BV[i]$−(trace block size/4)+correction amount, and the counting is started (Step S158).

On the other hand, if the flag FBFLG is set at "1" in Step S148, it means that the position of the rear LED 119 is to be detected. Accordingly, correction amounts ABH[i], ABV[i] for the trace block in the H-, and V-directions are calculated based on the Hc, Vc calculated in Step S146 and the previously corresponding calculated value BH[i], BV[i]: ABH[i]=a moved amount in the H-direction×α, ABV[i]=a moved amount in the V-direction×β (Step S160). The moved amounts in the respective H- and V-directions are obtained: BH[i]−Hc, BV[i]−Vc.

The values Hc, Vc are stored in BH[i], BV[i] corresponding to the front LED 118 (Step S162).

Since the detection of the front and rear LEDs 118 and 119 of the car of ID No. i is completed, the calculated values FH[i], FV[i] and BH[i], BV[i] are temporarily transferred and stored as RFH[i], RFV[i], RBH[i], and RBV[i] in the buffer from which the data are readable in the main routine (Step S164).

Upon the completion of the transfer and storage, the flag FBFLG is reset, i.e., the position of the front LED 118 is to be detected (Step S166). Subsequently, the start address (Hs, Vs) of the trace block for the front LED 118 is set (Step S168). In other words, the start address is set using the following equation:

$Hs = FH[i]$−(trace block size/2)+correction amount $Vs = FV[i]$−(trace block size/4)+correction amount.

Then, the count value of the counter i is incremented by 1 (Step S170), and the counting is started (Step S158), thereby repeating the aforementioned operations for the trace block of the next car 1.

Referring back to FIG. 11, after transferring the calculated values upon the completion of the Interrupt II, the identification number ID No. i is set to 0 (Step S40), and any more interrupt is prohibited (Step S42). The position data of the front and rear LEDs 118 and 119, i.e., RFH[i], RFV[i] and RBH[i], RBV[i] are read from the buffer (Step S44). The interrupts are allowed again upon the completion of this reading (Step S46). Since the data transfer by the Interrupt II is repeated between Steps S38 and S60, Steps S42 and S46 are provided to prevent the reading of the erroneous data even if the reading of the data from the buffer and the data transfer by the Interrupt II are carried out at the same timing.

The relationship between the position of the car 1 and the front and rear LEDs 118, 119 is predetermined. For example, the position of the car 1 may be an intermediate position of the front and rear LEDs 118 and 119. Upon determining the position of the car 1, the race development data, i.e., a goal position data and the speed data are set (Step S48). The goal position data is given to each car, and is a position data for designating passing points on the race track 2 at specified intervals.

The running direction of the car 1 is calculated based on the present goal position and the detected position of the car 1 (Step SS0). Further, a direction correction amount of the car 1 is calculated based on a target direction (direction toward the goal position) and the facing direction of the car 1 (which is calculated based on the positions of the front and rear LEDs 118 and 119 of the car 1). If the goal direction is calculated based on the data in three points: the present position, the next position and the further next position, the car 1 is capable of running more smoothly along the predetermined course. The speed and the direction are instructed to the car 1 based only on a goal speed data. More specifically, the speed instruction is given to one of the specific wheels, e.g., the motor 113 for driving the wheel 111, and the direction instruction is given in the form of a speed difference from the rotating speed of the motor 113. The direction can also be controlled by individually instructing the rotating speeds to the respective motors 113 and 114.

The obtained goal speed data is transmitted to the car 1 of the corresponding ID number via the transmission LEDs 7 (Step S52). and the count value of the counter i is incremented by 1 (Step S54). It is then discriminated whether the count value of the counter i is larger than 7 (Step S56). This routine returns to Step S42 if this count value is not larger than 7. If this count value is larger than 7, a system reset signal is checked (Step S58). The system reset signal is output in the case where an abnormality occurs in the system or when the race finishes.

If the system reset signal is not reset (NO in Step S60), this routine returns to Step S40 in which the count value of the counter i is set to "0". In this way, the running control for the cars 1 is continued until the race finishes. On the other hand, if the system reset signal is reset, this routine ends upon the judgment that the race has finished.

Although the initial position recognition (Steps S14 and S22) and the position detection during the tracing are performed by the different circuits in this embodiment, they may be performed by the single circuit. Further, although the position recognition is performed by individually turning on the front and rear LEDs 118 and 119 in the initial position recognition, it may be performed as follows. First, only the front LED 118 is turned on, and the front and rear LEDs 118 and 119 are turned on at a next timing. The position of the rear LED 119 is recognized by omitting the already recognized position of the front LED 118. This method requires only three kinds of control signals for the front and rear LEDs 118 and 119: one for turning the both LEDs 118 and 119 off, one for turning only the front LED 118 on, and one for turning the both LEDs 118 and 119 on. Further, a waiting period may be set based on the factor other than the frame in order to prevent a delay between the timing at which the front and rear LEDs 118 and 119 are turned on and the image pick-up timing so that the image can be securely picked up while the LEDs 118 and 119 are on.

In the foregoing embodiment, the race track change is performed by replacing the track board 21 with another one. However, any construction other than the above can be employed as far as it can change the race track displayed on the game machine.

Figure 16:
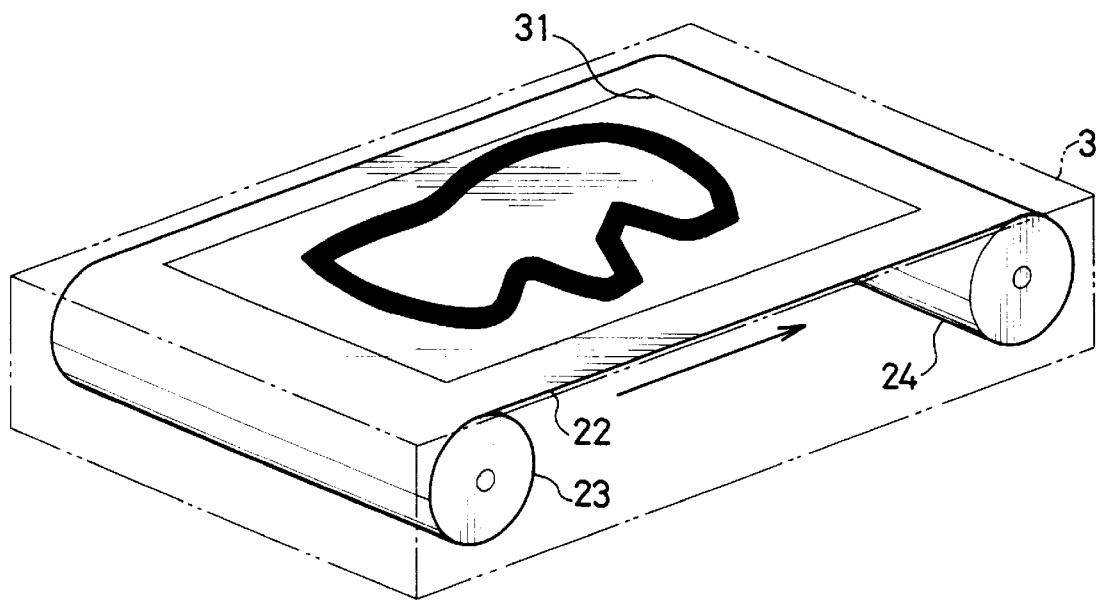
FIG. 16 is a perspective view showing another embodiment of the base for the game machine.

FIG. 16 shows another embodiment of the game machine according to this invention. Specifically, FIG. 16 is a perspective view of a base 3 in this embodiment. In this embodiment, a plurality of race tracks 2 are drawn on a sheet member 22, and a specified portion of the sheet member 22 is exposed outside from the surface of the base 3 by feeding the sheet member along a specified direction to thereby show the corresponding race track 2. For this purpose, the base 3 is formed with a hollow portion 31 (window) of a rectangular shape on an upper middle surface thereof. The sheet member 22 is flexible and is formed of a thin plastic or metallic plate. The sheet member 22 has opposite ends (leading and trail ends) thereof in the feeding direction wound around rollers 23 and 24, respectively. The rollers 23 and 24 are disposed away from each other by a specified distance in the base 3. The car 1 can run within the specified exposed area on the sheet member 22 set by the rollers 23 and 24.

Although not shown in FIG. 16, the base 3 is arranged with a feed mechanism for winding the sheet member 22 in the direction shown by the arrow in FIG. 16, i.e., in the direction of feeding the sheet member 22 from the roller 23 toward the roller 24. The feed mechanism comprises a drive mechanism including a motor for drivingly rotating the roller 24 in the winding direction and a guide member for guiding the sheet member 22. The aforementioned drive mechanism may be a manually operated mechanism in which an operator manually winds up the sheet member 22 as far as he can control the feeding speed.

Considering the fact that the sheet member 22 is formed of a flexible material, the specified portion of the base 3 near the window frame is provided with a support member (not shown) for supporting the sheet member 22 from backward. Preferably, the window 31 may be mounted with a transparent plate made of glass or equivalent thereon to eliminate a worn-out state of the sheet member 22 resulting from a friction between the sheet member and the car 1 and to prevent dusts and foreign matters from intruding in the base 3.

In the foregoing embodiments, the course data is designated by setting the target positions of the respective cars. However, designation of the course data is not limited to the above but can be freely configured as far as the cars can run along the specified route within the race track.

As an example, coordinate values representative of the perimeter of the race track may be given as course data. The cars are controlled by detecting a distance between the respective cars at a specified time interval to prevent the cars from colliding with each other and to prevent all the cars from running off the race track. In this case, the coordinate value for the course data is not necessarily the actually calculated coordinate value but may be obtained by setting a virtual coordinate value and converting the same to an actual coordinate value by coordinate conversion.

Alternatively, a virtual coordinate system may be set by creating a linear race track, any point of which has a one to one correspondence with the point on an actual race track, and an actual coordinate value may be obtained by implementing the coordinate conversion, taking into consideration of the actual race track.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A game machine provided with moving means running on a specified race track comprising:

drive controlling means for selecting the specified race track from among a plurality of race tracks and for controlling the moving means to run on the specified race track.

2. A game machine according to claim 1, further comprising course data storage means for storing a plurality of course data, each of which corresponds to the one of plurality of race tracks therein, and the drive controlling means controls the moving means to run on the specified race track in accordance with the course data corresponding to the specified race track.

3. A game machine according to claim 2, wherein
the moving means includes a plurality of moving objects running on the specified race track, and the course data is a data for allowing the respective moving objects to run on the specified race track independently of one another.

4. A game machine according to claim 3, wherein the course data is a data for designating a route for the respective moving objects along which the moving object is to run.

5. A game machine according to claim 4, wherein the course data includes a data concerning a number of target points arranged along the route, wherein the corresponding moving object is to pass the target points in time sequence and the drive controlling means controls the moving objects to run along the respective routes, while aiming at the target points arranged along the routes.

6. A game machine according to claim 3, wherein the course data is a data for designating a coordinate with respect to the specified race track.

7. A game machine according to claim 6, wherein the drive controlling means controllably regulates the respective moving objects from running off the race track.

8. A game machine according to claim 7, further comprising position detecting means for detecting a position of the respective moving objects on the race track, and the drive controlling means controls a movement of the respective moving objects based on a distance between the respective moving objects.

9. A game machine according to claim 1, wherein the game machine comprises a main body and a replaceable member which is detachably mounted onto the main body and the race track is provided on the replaceable member.

10. A game machine according to claim 1, wherein the drive controlling means includes selecting means for selecting the race track on which the moving means is to run, from among the plurality of race tracks.

11. A game machine according to claim 10, wherein selecting means includes:
a display member which includes a sheet provided with the plurality of race tracks; and
exposure means for exposing a specified area of the display member to select the race track on which the moving means is to run.

12. A game machine according to claim 10, wherein the selecting means includes display means for displaying the race track on a running surface on which the moving means runs.

13. A game machine according to claim 1, further comprising:
position detecting means for detecting a position of the moving means on the race track;
target position calculating means for calculating a target position of the moving means based on the position of the moving means detected by the position detecting means; and
target control means for controlling the moving means to run toward the target position calculated by the target position calculating means.

* * * * *